(12) United States Patent
Yamashita et al.

(10) Patent No.: US 12,399,353 B2
(45) Date of Patent: Aug. 26, 2025

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventors: Masashi Yamashita, Tokyo (JP); Akino Kondo, Yokohama (JP)

(73) Assignee: Nikon Corporation, Tokyo (JP)

( * ) Notice: Subject to any disclaimer, the term of this patent is extended or adjusted under 35 U.S.C. 154(b) by 305 days.

(21) Appl. No.: 18/009,669

(22) PCT Filed: Apr. 12, 2021

(86) PCT No.: PCT/JP2021/015136
§ 371 (c)(1),
(2) Date: Dec. 9, 2022

(87) PCT Pub. No.: WO2021/256065
PCT Pub. Date: Dec. 23, 2021

(65) Prior Publication Data
US 2023/0258914 A1 Aug. 17, 2023

(30) Foreign Application Priority Data
Jun. 18, 2020 (JP) .................. 2020-105549

(51) Int. Cl.
*G02B 15/20* (2006.01)
*G02B 15/14* (2006.01)

(52) U.S. Cl.
CPC ......... *G02B 15/1441* (2019.08); *G02B 15/20* (2013.01)

(58) Field of Classification Search
CPC .... G02B 15/1441; G02B 15/20; G02B 13/00; G02B 13/18; G02B 15/144105; G02B 13/02
See application file for complete search history.

(56) References Cited

U.S. PATENT DOCUMENTS

2014/0036136 A1* 2/2014 Kimura .......... G02B 15/144113
359/683
2014/0139722 A1 5/2014 Sugita
(Continued)

FOREIGN PATENT DOCUMENTS

CN        103837969 A    6/2014
JP        2014-102462 A  6/2014
(Continued)

OTHER PUBLICATIONS

"Lens Design Optimization" Yabe, Akira, SPIE, 2018, pp. 41-42 (Year: 2018).*
(Continued)

*Primary Examiner* — Balram T Parbadia
*Assistant Examiner* — John Curtis Sipes
(74) *Attorney, Agent, or Firm* — Potomac Law Group, PLLC

(57) ABSTRACT

This optical system (OL) has a first lens group (G1) having positive refractory power, a second lens group (G2), a third lens group (G3), and a fourth lens group (G4) which are aligned in order from an object side along an optical axis, wherein when focused from an infinity object to a short-distance object, the second lens group (G2) and the third lens group (G3) move in mutually different trajectories along the optical axis, and the second lens group (G2) and the third lens group (G3) are composed of three or less lenses in total.

21 Claims, 12 Drawing Sheets

(56) References Cited

U.S. PATENT DOCUMENTS

| | | | |
|---|---|---|---|
| 2018/0074289 A1 | 3/2018 | Ichikawa et al. | |
| 2018/0164558 A1* | 6/2018 | Saito | G02B 15/173 |
| 2019/0339497 A1 | 11/2019 | Gyoda | |
| 2020/0301117 A1* | 9/2020 | Koga | G02B 15/20 |
| 2020/0341246 A1 | 10/2020 | Machida | |

FOREIGN PATENT DOCUMENTS

| | | |
|---|---|---|
| JP | 2017-211489 A | 11/2017 |
| JP | 2017-223754 A | 12/2017 |
| JP | 2019-194630 A | 11/2019 |
| WO | WO 2016/194113 A1 | 12/2016 |
| WO | WO 2018/135000 A1 | 7/2018 |
| WO | WO 2019/097716 A1 | 5/2019 |
| WO | WO 2019/220614 A1 | 11/2019 |

OTHER PUBLICATIONS

"Understanding Focal Length and Field of View", Hollows et al., Edmund Optics, 2016 (Year: 2016).*
International Preliminary Report on Patentability from International Patent Application No. PCT/JP2021/015136, Dec. 29, 2022.
International Search Report from International Patent Application No. PCT/JP2021/015136, Jun. 22, 2021.
Office Action issued Apr. 25, 2023, in Japanese Patent Application No. 2022-532333.
Office Action issued Mar. 4, 2025, in Japanese Patent Application No. 2023-199838.
Office Action issued Jun. 20, 2025, in Chinese Patent Application No. 202180042589.X.

* cited by examiner

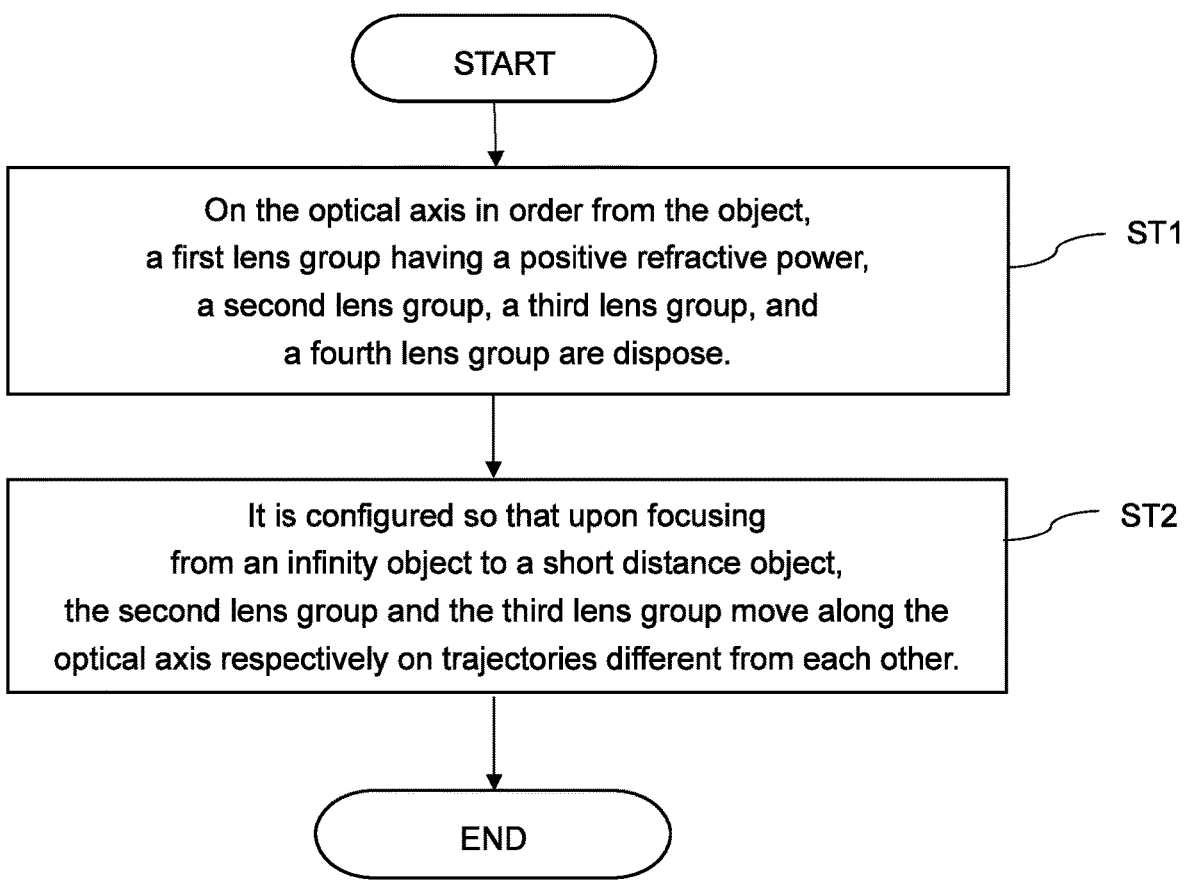

OPTICAL SYSTEM, OPTICAL APPARATUS AND METHOD FOR MANUFACTURING THE OPTICAL SYSTEM

TECHNICAL FIELD

The present invention relates to an optical system, an optical apparatus, and a method for manufacturing the optical system.

TECHNICAL BACKGROUND

Conventionally, an optical system suitable for a digital still camera, a video camera and the like have been proposed (for example, see Patent literature 1). Such an optical system is required to maintain an excellent optical performance from focusing on infinity to focusing on a short distance object.

PRIOR ARTS LIST

Patent Document

Patent literature 1: Japanese Laid-Open Patent Publication No. 2019-194630(A)

SUMMARY OF THE INVENTION

An optical system according to a first present invention comprises, in order from an object on an optical axis: a first lens group having a positive refractive power; a second lens group; a third lens group; and a fourth lens group, wherein upon focusing from an infinity object to a short distance object, the second lens group and the third lens group move along the optical axis respectively on trajectories different from each other, and the second lens group and the third lens group collectively include three lenses or less.

An optical system according to a second present invention comprises, in order from an object on an optical axis: a first lens group having a positive refractive power; a second lens group; a third lens group; and a fourth lens group, wherein upon focusing from an infinity object to a short distance object, the second lens group and the third lens group move along the optical axis respectively on trajectories different from each other, and the following conditional expression is satisfied, $$0.010 < (\Delta x2A + \Delta x3A)/D1 < 0.200$$

where $\Delta x2A$: an absolute value of an amount of movement of the second lens group upon focusing from an infinity object to a short distance object, $\Delta x3A$: an absolute value of an amount of movement of the third lens group upon focusing from the infinity object to the short distance object, and D1: a length of the first lens group on the optical axis.

An optical apparatus according to the present invention comprises the optical system described above.

A method for manufacturing an optical system comprising, in order from an object on an optical axis: a first lens group having a positive refractive power; a second lens group; a third lens group; and a fourth lens group according to the present invention, comprises a step of disposing the first to the fourth lens groups in a lens barrel so that:

upon focusing from an infinity object to a short distance object, the second lens group and the third lens group move along the optical axis respectively on trajectories different from each other, and the second lens group and the third lens group collectively include three lenses or less.

BRIEF DESCRIPTION OF THE DRAWINGS

FIG. 12 is a flowchart showing a method for manufacturing the optical system according to each embodiment.

DESCRIPTION OF THE EMBODIMENTS

Figure 11:
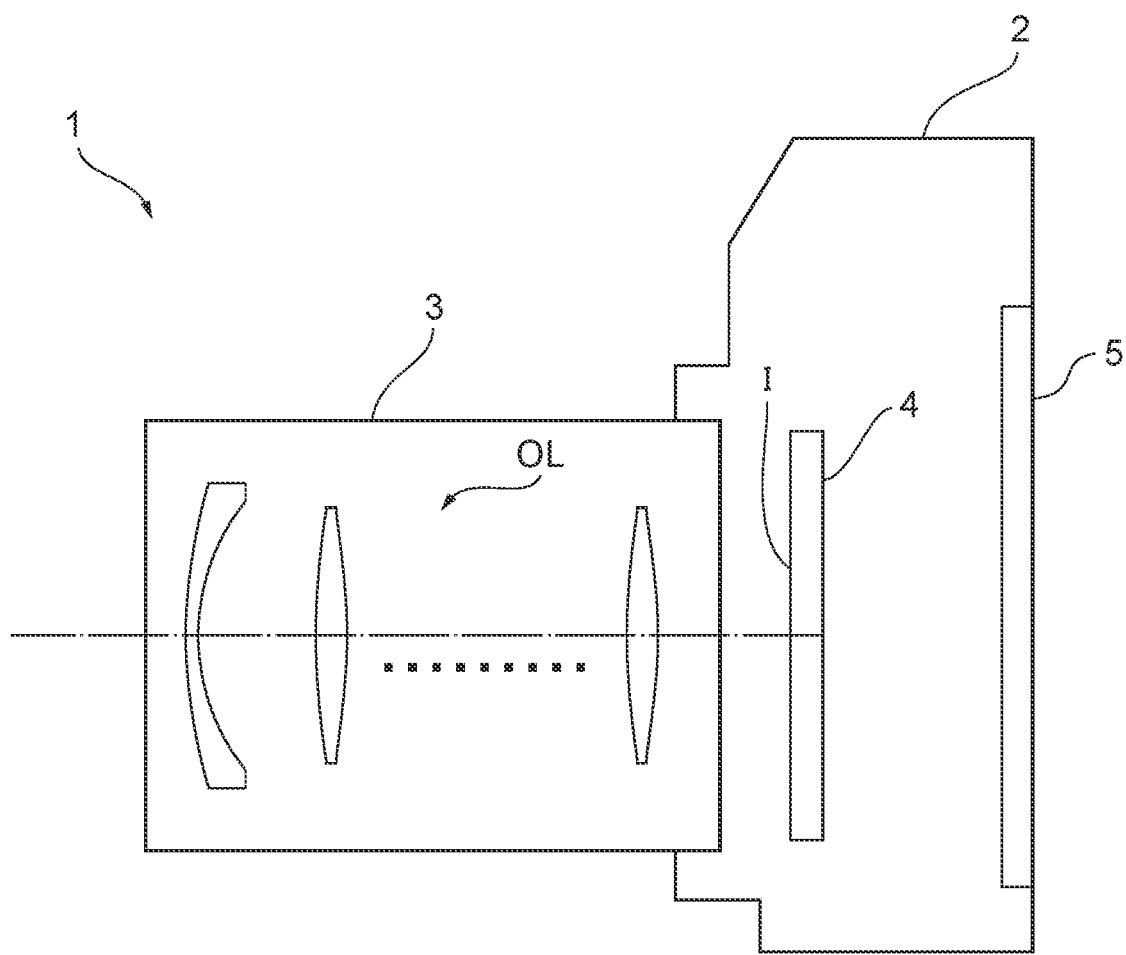
FIG. 11 shows a configuration of a camera that includes the optical system according to each embodiment.

Hereinafter, preferred embodiments according to the present invention are described. First, a camera (optical apparatus) that includes an optical system according to each embodiment is described with reference to FIG. 11. As shown in FIG. 11, the camera 1 includes a main body 2, and a photographing lens 3 attached to the main body 2. The main body 2 includes an image-pickup element 4, a main body controller (not shown) that controls the operation of the digital camera, and a liquid crystal screen 5. The photographing lens 3 includes: an optical system OL that consists of a plurality of lens groups; and a lens position control mechanism (not shown) that controls the position of each lens group. The lens position control mechanism includes: sensors that detect the positions of the lens groups; motors that move the lens groups forward and backward along the optical axis; and a control circuit that drives the motors.

Light from a subject is collected by the optical system OL of the photographing lens 3, and reaches an image surface I of the image-pickup element 4. The light having reached the image surface I from the subject is photoelectrically converted by the image-pickup element 4 into digital image data, which is recorded in a memory, not show. The digital image data recorded in the memory can be displayed on the liquid crystal screen 5 in response to the operation of a user. Note that the camera may be a mirrorless camera, or a single-lens reflex camera that includes a quick return mirror. The optical system OL shown in FIG. 11 is the schematically shown optical system included in the photographing lens 3. The lens configuration of the optical system OL is not limited to this configuration.

Figure 1:
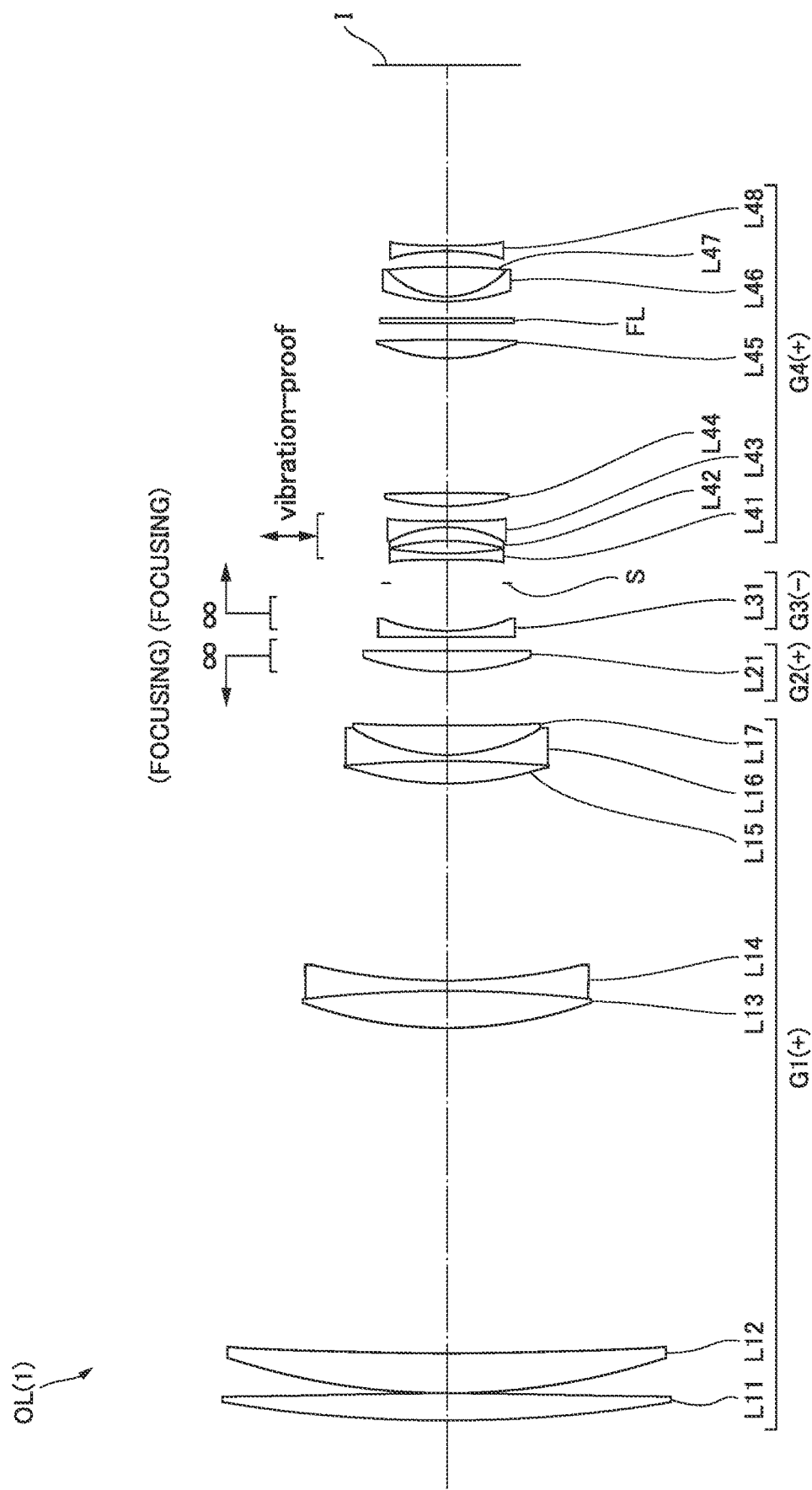
FIG. 1 shows a lens configuration of an optical system according to First Example.

Next, an optical system according to a first embodiment is described. As shown in FIG. 1, an optical system OL(1) that is an example of an optical system (photographing lens) OL according to the first embodiment comprises, in order from the object on the optical axis: a first lens group G1 having a positive refractive power; a second lens group G2; a third lens group G3; and a fourth lens group G4. Upon focusing from an infinity object to a short distance object, the second lens group G2 and the third lens group G3 move along the optical axis respectively on trajectories different from each other. The second lens group G2 and the third lens group G3 collectively include three lenses or less.

According to the first embodiment, the optical system that has an excellent optical performance from focusing on infinity to focusing on the short distance object, and the optical apparatus that comprises the optical system. The optical system OL according to the first embodiment may be the optical system OL(2) shown in FIG. 3, the optical system OL(3) shown in FIG. 5, the optical system OL(4) shown in FIG. 7, or the optical system OL(5) shown in FIG. 9.

Next, an optical system according to a second embodiment is described. As shown in FIG. 1, an optical system OL(1) that is an example of an optical system (photographing lens) OL according to the second embodiment comprises, in order from the object on the optical axis: a first lens group G1 having a positive refractive power; a second lens group G2; a third lens group G3; and a fourth lens group G4. Upon focusing from an infinity object to a short distance object, the second lens group G2 and the third lens group G3 move along the optical axis respectively on trajectories different from each other.

As to the configuration described above, the optical system OL according to the second embodiment satisfies the following conditional expression (1).

$$0.010 < (\Delta x2A + \Delta x3A)/D1 < 0.200 \quad (1)$$

where $\Delta x2A$: an absolute value of an amount of movement of the second lens group G2 upon focusing from an infinity object to a short distance object, $\Delta x3A$: an absolute value of an amount of movement of the third lens group G3 upon focusing from the infinity object to the short distance object, and D1: a length of the first lens group G1 on the optical axis.

The second embodiment can achieve the optical system that has an excellent optical performance from focusing on infinity to focusing on the short distance object, and the optical apparatus that comprises the optical system. The optical system OL according to the second embodiment may be the optical system OL(2) shown in FIG. 3, the optical system OL(3) shown in FIG. 5, the optical system OL(4) shown in FIG. 7, or the optical system OL(5) shown in FIG. 9.

The conditional expression (1) defines an appropriate relationship between the sum of the amount of movement of the second lens group G2 and the amount of movement of the third lens group G3 upon focusing, and the length of the first lens group G1 on the optical axis. By satisfying the conditional expression (1), the aberration fluctuation upon focusing from the infinity object to the short distance object can be suppressed.

If the corresponding value of the conditional expression (1) falls below the lower limit value, the amounts of movement of the second lens group G2 and the third lens group G3 that perform focusing become small. Accordingly, the powers of the second lens group G2 and the third lens group G3 tend to be high. Consequently, it is difficult to suppress aberration fluctuation upon focusing. By setting the lower limit value of the conditional expression (1) to 0.015, 0.020, 0.025, 0.030, 0.035, 0.040, or further to 0.042, the advantageous effects of this embodiment can be more secured.

If the corresponding value of the conditional expression (1) exceeds the upper limit value, the first lens group G1 becomes short. Accordingly, the power of the first lens group G1 tends to be high. Consequently, it is difficult to correct various aberrations, such as the longitudinal chromatic aberration and the spherical aberration. By setting the upper limit value of the conditional expression (1) to 0.175, 0.160, 0.150, 0.125, 0.115, 0.110, or further to 0.100, the advantageous effects of this embodiment can be more secured.

Preferably, the optical systems OL according to the first embodiment and the second embodiment satisfy the following conditional expression (2).

$$-0.20 < \Delta x2/f2 < 0.00 \quad (2)$$

where $\Delta x2$: an amount of movement of the second lens group G2 (a sign of an amount of movement toward an image surface is + and a sign of the amount of movement toward the object is −) upon focusing from the infinity object to the short distance object, and f2: a focal length of the second lens group G2.

The conditional expression (2) defines an appropriate relationship between the amount of movement of the second lens group G2 upon focusing and the focal length of the second lens group G2. By satisfying the conditional expression (2), the aberration fluctuation upon focusing from the infinity object to the short distance object can be suppressed.

If the corresponding value of the conditional expression (2) falls below the lower limit value, the power of the second lens group G2 that performs focusing becomes high. Accordingly, it is difficult to suppress aberration fluctuation upon focusing. Furthermore, the amount of movement of the second lens group G2 that performs focusing becomes large, which increases the entire length of the optical system OL. For suppressing increase in the entire length of the optical system OL, it is required to shorten the first lens group G1 and increase the power of the first lens group G1, for example. Accordingly, it is difficult to correct the various aberrations, such as the longitudinal chromatic aberration and the spherical aberration. By setting the lower limit value of the conditional expression (2) to −0.18, −0.15, −0.13, −0.10, −0.09, or further to −0.08, the advantageous effects of each embodiment can be more secured.

If the corresponding value of the conditional expression (2) reaches the upper limit value, it becomes difficult to secure the power or the amount of movement of the second lens group G2 that performs focusing. Accordingly, it is not preferable. By setting the upper limit value of the conditional expression (2) to −0.01, or further to −0.02, the advantageous effects of each embodiment can be more secured.

Preferably, the optical systems OL according to the first embodiment and the second embodiment satisfy the following conditional expression (3).

$$-0.20 < \Delta x3/f3 < 0.00 \quad (3)$$

where $\Delta x3$: an amount of movement of the third lens group G3 (a sign of an amount of movement toward an image surface is + and a sign of the amount of movement toward the object is −) upon focusing from the infinity object to the short distance object, and f3: a focal length of the third lens group G3.

The conditional expression (3) defines an appropriate relationship between the amount of movement of the third lens group G3 upon focusing and the focal length of the third lens group G3. By satisfying the conditional expression (3), the aberration fluctuation upon focusing from the infinity object to the short distance object can be suppressed.

If the corresponding value of the conditional expression (3) falls below the lower limit value, the power of the third lens group G3 that performs focusing becomes high. Accordingly, it is difficult to suppress aberration fluctuation upon focusing. Furthermore, the amount of movement of the third lens group G3 that performs focusing becomes large, which increases the entire length of the optical system OL. For suppressing increase in the entire length of the optical system OL, it is required to shorten the first lens group G1 and increase the power of the first lens group G1, for example. Accordingly, it is difficult to correct the various aberrations, such as the longitudinal chromatic aberration and the spherical aberration. By setting the lower limit value of the conditional expression (3) to −0.18, −0.16, or further to −0.15, the advantageous effects of each embodiment can be more secured.

If the corresponding value of the conditional expression (3) reaches the upper limit value, it becomes difficult to secure the power or the amount of movement of the third lens group G3 that performs focusing. Accordingly, it is not preferable. By setting the upper limit value of the conditional expression (3) to −0.01, the advantageous effects of each embodiment can be more secured.

Preferably, the optical systems OL according to the first embodiment and the second embodiment satisfy the following conditional expression (4).

$$1.00 < f2/(-f3) < 4.00 \quad (4)$$

where f2: a focal length of the second lens group G2, and f3: a focal length of the third lens group G3.

The conditional expression (4) defines an appropriate relationship between the focal length of the second lens group G2 and the focal length of the third lens group G3. By satisfying the conditional expression (4), the aberration fluctuation upon focusing from the infinity object to the short distance object can be suppressed.

If the corresponding value of the conditional expression (4) falls below the lower limit value, the power of the second lens group G2 that performs focusing becomes high. Accordingly, it is difficult to suppress aberration fluctuation upon focusing. By setting the lower limit value of the conditional expression (4) to 1.05, 1.10, 1.15, 1.20, 1.25, 1.30, or further to 1.35, the advantageous effects of each embodiment can be more secured.

If the corresponding value of the conditional expression (4) exceeds the upper limit value, the power of the third lens group G3 that performs focusing becomes high. Accordingly, it is difficult to suppress aberration fluctuation upon focusing. By setting the upper limit value of the conditional expression (4) to 3.80, 3.50, 3.25, 3.00, 2.85, 2.80, 2.75, or further to 2.70, the advantageous effects of each embodiment can be more secured.

Preferably, the optical systems OL according to the first embodiment and the second embodiment satisfy the following conditional expression (5).

$$-3.00 < \Delta x2/\Delta x3 < -0.20 \quad (5)$$

where Δx2: an amount of movement of the second lens group G2 (a sign of an amount of movement toward an image surface is + and a sign of the amount of movement toward the object is −) upon focusing from the infinity object to the short distance object, and Δx3: an amount of movement of the third lens group G3 (a sign of an amount of movement toward an image surface is + and a sign of the amount of movement toward the object is −) upon focusing from the infinity object to the short distance object.

The conditional expression (5) defines an appropriate relationship between the amount of movement of the second lens group G2 upon focusing and the amount of movement of the third lens group G3 upon focusing. By satisfying the conditional expression (5), the various aberrations, such as the longitudinal chromatic aberration and the spherical aberration, can be favorably corrected.

If the corresponding value of the conditional expression (5) falls below the lower limit value, the amount of movement of the second lens group G2 that performs focusing becomes large, which increases the entire length of the optical system OL. For suppressing increase in the entire length of the optical system OL, it is required to shorten the first lens group G1 and increase the power of the first lens group G1, for example. Accordingly, it is difficult to correct the various aberrations, such as the longitudinal chromatic aberration and the spherical aberration. By setting the lower limit value of the conditional expression (5) to −2.85, −2.70, −2.60, −2.50, −2.45, or further to −2.40, the advantageous effects of each embodiment can be more secured.

If the corresponding value of the conditional expression (5) exceeds the upper limit value, the amount of movement of the third lens group G3 that performs focusing becomes large, which increases the entire length of the optical system OL. For suppressing increase in the entire length of the optical system OL, it is required to shorten the first lens group G1 and increase the power of the first lens group G1, for example. Accordingly, it is difficult to correct the various aberrations, such as the longitudinal chromatic aberration and the spherical aberration. By setting the upper limit value of the conditional expression (5) to −0.25, −0.30, −0.35, −0.40, −0.45, or further to −0.50, the advantageous effects of each embodiment can be more secured.

Preferably, in the optical systems OL according to the first embodiment and the second embodiment, the fourth lens group G4 comprises a vibration-proof group that has a negative refractive power and is movable so as to have a displacement component in a direction perpendicular to the optical axis to correct an image blur. Accordingly, the aberration fluctuation during image blur correction can be suppressed.

Preferably, in the optical systems OL according to the first embodiment and the second embodiment, the vibration-proof group comprises two or more lenses. Accordingly, the aberration fluctuation during image blur correction can be suppressed.

Preferably, the optical systems OL according to the first embodiment and the second embodiment satisfy the following conditional expression (6).

$$-8.50 < f1/fVR < -3.00 \quad (6)$$

where f1: a focal length of the first lens group G1, and fVR: a focal length of the vibration-proof group.

The conditional expression (6) defines an appropriate relationship between the focal length of the first lens group G1 and the focal length of the vibration-proof group. By satisfying the conditional expression (6), the aberration fluctuation during image blur correction can be suppressed.

If the corresponding value of the conditional expression (6) falls below the lower limit value, the power of the vibration-proof group becomes high. Accordingly, it is difficult to suppress aberration fluctuation during image blur correction. By setting the lower limit value of the conditional expression (6) to −8.25, −8.10, −8.00, −7.85, −7.70, −7.50, −7.30, or further to −7.25, the advantageous effects of each embodiment can be more secured.

If the corresponding value of the conditional expression (6) exceeds the upper limit value, the power of the first lens group G1 becomes high. Accordingly, it is difficult to correct various aberrations, such as the longitudinal chromatic aberration and the spherical aberration. By setting the upper limit value of the conditional expression (6) to −3.15, −3.30, −3.50, −3.65, −3.80, −4.00, −4.10, −4.20, or further to −4.25, the advantageous effects of each embodiment can be more secured.

Preferably, the optical systems OL according to the first embodiment and the second embodiment satisfy the following conditional expression (7).

$$0.45 < \beta 2 < 0.80 \tag{7}$$

where β2: a magnification of the second lens group G2 upon focusing on the infinity object.

The conditional expression (7) defines an appropriate range of the magnification of the second lens group G2 upon focusing on the infinity object. By satisfying the conditional expression (7), fluctuation of the various aberrations including the spherical aberration upon focusing can be suppressed.

If the corresponding value of the conditional expression (7) falls below the lower limit value, it is difficult to suppress fluctuation in various aberrations upon focusing. By setting the lower limit value of the conditional expression (7) to 0.46, 0.47, 0.48, or further to 0.49, the advantageous effects of each embodiment can be more secured.

If the corresponding value of the conditional expression (7) exceeds the upper limit value, it is difficult to suppress fluctuation in various aberrations upon focusing. By setting the upper limit value of the conditional expression (7) to 0.78, 0.75, 0.73, or further to 0.70, the advantageous effects of each embodiment can be more secured.

Preferably, the optical systems OL according to the first embodiment and the second embodiment satisfy the following conditional expression (8).

$$0.20 < 1/\beta 3 < 0.50 \tag{8}$$

where β3: a magnification of the third lens group G3 upon focusing on the infinity object.

The conditional expression (8) defines an appropriate range of the magnification of the third lens group G3 upon focusing on the infinity object. By satisfying the conditional expression (8), fluctuation of the various aberrations including the spherical aberration upon focusing can be suppressed.

If the corresponding value of the conditional expression (8) falls below the lower limit value, it is difficult to suppress variation in various aberrations upon focusing. By setting the lower limit value of the conditional expression (8) to 0.22, 0.24, 0.25, or further to 0.26, the advantageous effects of each embodiment can be more secured.

If the corresponding value of the conditional expression (8) exceeds the upper limit value, it is difficult to suppress fluctuation in various aberrations upon focusing. By setting the upper limit value of the conditional expression (8) to 0.48, 0.46, 0.45, or further to 0.44, the advantageous effects of each embodiment can be more secured.

Preferably, the optical systems OL according to the first embodiment and the second embodiment satisfy the following conditional expression (9).

$$\{\beta 2 + (1/\beta 2)\}^{-2} < 0.25 \tag{9}$$

where β2: a magnification of the second lens group G2 upon focusing on the infinity object.

The conditional expression (9) defines an appropriate range of the magnification of the second lens group G2 upon focusing on the infinity object. By satisfying the conditional expression (9), the amount of movement of the focusing group can be reduced, while suppressing the fluctuation in the various aberrations, such as the spherical aberration, the distortion, and the coma aberration, upon focusing.

Preferably, the corresponding value of the conditional expression (9) is in the conditional expression range. If the lower limit value of the conditional expression (9) is set to 0.10, 0.12, 0.14, or further to 0.15, the advantageous effects of each embodiment can be more secured.

If the corresponding value of the conditional expression (9) exceeds the upper limit value, it is difficult to suppress fluctuation in various aberrations upon focusing. By setting the upper limit value of the conditional expression (9) to 0.24, or further to 0.23, the advantageous effects of each embodiment can be more secured.

Preferably, the optical systems OL according to the first embodiment and the second embodiment satisfy the following conditional expression (10).

$$\{\beta 3 + (1/\beta 3)\}^{-2} < 0.18 \tag{10}$$

where β3: a magnification of the third lens group G3 upon focusing on the infinity object.

The conditional expression (10) defines an appropriate range of the magnification of the third lens group G3 upon focusing on the infinity object. By satisfying the conditional expression (10), the amount of movement of the focusing group can be reduced, while suppressing the fluctuation in the various aberrations, such as the spherical aberration, the distortion, and the coma aberration, upon focusing.

Preferably, the corresponding value of the conditional expression (10) is in the conditional expression range. If the lower limit value of the conditional expression (10) is set to 0.03, or further to 0.05, the advantageous effects of each embodiment can be more secured.

If the corresponding value of the conditional expression (10) exceeds the upper limit value, it is difficult to suppress fluctuation in various aberrations upon focusing. By setting the upper limit value of the conditional expression (10) to 0.16, 0.15, or further to 0.14, the advantageous effects of each embodiment can be more secured.

Preferably, in the optical systems OL in the first embodiment and the second embodiment, the first lens group G1 comprises a positive lens (L15) satisfying the following conditional expressions (11) to (13).

$$ndL1 + (0.01425 \times vdL1) < 2.12 \tag{11}$$

$$vdL1 < 35.00 \tag{12}$$

$$0.702 < \theta gFL1 + (0.00316 \times vdL1) \tag{13}$$

where ndL1: a refractive index of the positive lens for d-line,
vdL1: an Abbe number of the positive lens with reference to d-line, and
θgFL1: a partial dispersion ratio of the positive lens, the partial dispersion ratio being defined by the following expression, assuming that a refractive index of the positive lens for g-line is ngL1, a refractive index of the positive lens for F-line is nFL1, and a refractive index of the positive lens for C-line is nCL1, $$\theta gFL1=(ngL1-nFL1)/(nFL1-nCL1).$$

Note that the Abbe number vdL1 of the positive lens with reference to d-line is defined by the following expression.

$$vdL1=(ndL1-1)/(nFL1-nCL1)$$

The conditional expression (11) defines an appropriate relationship between the refractive index of the positive lens in the first lens group G1 for d-line, and the Abbe number of the positive lens with reference to d-line. By satisfying the conditional expression (11), correction of the reference aberrations, such as the spherical aberration and the coma aberration, and correction (achromatization) of the primary chromatic aberration can be favorably performed.

If the corresponding value of the conditional expression (11) exceeds the upper limit value, the Petzval sum becomes small, and the correction of the curvature of field becomes difficult, for example. Accordingly, it is not preferable. By setting the upper limit value of the conditional expression (11) to 2.11, 2.10, 2.09, 2.08, 2.07, or further to 2.06, the advantageous effects of each embodiment can be more secured.

The lower limit value of the conditional expression (11) may be set to 1.83. If the corresponding value of the conditional expression (11) falls below the lower limit value, correction of the reference aberrations and the chromatic aberrations becomes excessive. Accordingly, it is not preferable. By setting the lower limit value of the conditional expression (11) to 1.85, 1.90, 1.95, or further to 1.98, the advantageous effects of each embodiment can be more secured.

The conditional expression (12) defines an appropriate range of the Abbe number of the positive lens in the first lens group G1 with reference to d-line. By satisfying the conditional expression (12), correction of the reference aberrations, such as the spherical aberration and the coma aberration, and correction (achromatization) of the primary chromatic aberration can be favorably performed.

If the corresponding value of the conditional expression (12) exceeds the upper limit value, correction of the longitudinal chromatic aberration becomes difficult in the lens group disposed closer to the image surface than the positive lens, for example. Accordingly, it is not preferable. By setting the upper limit value of the conditional expression (12) to 32.50, 32.00, 31.50, 31.00, 30.50, 30.00, or further to 29.50, the advantageous effects of each embodiment can be more secured.

The lower limit value of the conditional expression (12) may be set to 18.00. If the corresponding value of the conditional expression (12) falls below the lower limit value, correction of the reference aberrations and the chromatic aberrations becomes excessive. Accordingly, it is not preferable. By setting the lower limit value of the conditional expression (12) to 18.50, 19.00, 19.50, or further to 20.00, the advantageous effects of each embodiment can be more secured.

The conditional expression (13) appropriately defines the anomalous dispersion characteristics of the positive lens in the first lens group G1. By satisfying the conditional expression (13), the secondary spectrum in addition to the primary achromatization can be favorably corrected in correction of chromatic aberrations.

If the corresponding value of the conditional expression (13) falls below the lower limit value, the anomalous dispersion characteristics of the positive lens decrease. Accordingly, correction of the chromatic aberrations is difficult. By setting the lower limit value of the conditional expression (13) to 0.704, 0.708, 0.710, 0.712, or further to 0.715, the advantageous effects of each embodiment can be more secured.

The upper limit value of the conditional expression (13) may be set to 0.900. If the corresponding value of the conditional expression (13) exceeds the upper limit value, correction of the chromatic aberrations becomes excessive. Accordingly, it is not preferable. By setting the upper limit value of the conditional expression (13) to 0.880, 0.850, 0.825, or further to 0.800, the advantageous effects of each embodiment can be more secured.

Preferably, the optical systems OL according to the first embodiment and the second embodiment comprises lenses (L12 and L13) that satisfy the following conditional expression (14). Note that for discrimination from the other lenses, the lenses satisfying the conditional expression (14) are sometimes called specified lenses.

$$80.00<vdL2 \tag{14}$$

where vdL2: an Abbe number of the specified lens with reference to d-line.

The conditional expression (14) defines an appropriate range of the Abbe number of the specified lens with reference to d-line. By satisfying the conditional expression (14), the longitudinal chromatic aberration and the chromatic aberration of magnification can be favorably corrected.

If the corresponding value of the conditional expression (14) falls below the lower limit value, it is difficult to correct the longitudinal chromatic aberration and the chromatic aberration of magnification. By setting the lower limit value of the conditional expression (14) to 81.00, 81.80, 82.50, 84.00, 85.50, 87.00, or further to 90.00, the advantageous effects of each embodiment can be more secured.

The upper limit value of the conditional expression (14) may be set to 110.00. If the corresponding value of the conditional expression (14) exceeds the upper limit value, correction of the longitudinal chromatic aberration and the chromatic aberration of magnification becomes excessive. Accordingly, it is not preferable. By setting the upper limit value of the conditional expression (14) to 107.50, 105.00, 102.50, 100.00, further to 98.00, the advantageous effects of each embodiment can be more secured.

Preferably, the optical systems OL according to the first embodiment and the second embodiment satisfy the following conditional expression (15).

$$3.50°<2\omega<8.50° \tag{15}$$

where 2ω: a full angle of view of the optical system OL.

The conditional expression (15) defines an appropriate range of the full angle of view of the optical system OL. By satisfying the conditional expression (15), the telescopic optical system having a long focal length can be obtained. Accordingly, it is preferable. By setting the lower limit value of the conditional expression (15) to 3.80°, or further to 4.00°, the advantageous effects of each embodiment can be more secured. By setting the upper limit value of the conditional expression (15) to 8.00°, 7.50°, 7.00°, or further to 6.50°, the advantageous effects of each embodiment can be more secured.

Preferably, in the optical systems OL according to the first embodiment and the second embodiment, upon focusing from the infinity object to the short distance object, the second lens group G2 moves along the optical axis toward the object, and the third lens group G3 moves along the optical axis toward the image surface. Accordingly, the aberration fluctuation upon focusing from the infinity object to the short distance object can be preferably corrected. The space for the optical system OL can be effectively used. The entire length of the optical system OL can be short while maintaining a favorable optical performance.

Preferably, in the optical systems OL according to the first embodiment and the second embodiment, the second lens group G2 consists of one lens. Since the second lens group G2 thus decreases in weight, focusing from the infinity object to the short distance object can be performed at high speed. The lens diameter is not required to be reduced for reducing the weight of the focusing group. Accordingly, the various aberrations, such as the longitudinal chromatic aberration and the spherical aberration, can be favorably corrected without making the power of the first lens group G1 too high, for example.

Preferably, in the optical systems OL according to the first embodiment and the second embodiment, the third lens group G3 consists of one lens component. Since the third lens group G3 thus decreases in weight, focusing from the infinity object to the short distance object can be performed at high speed. The lens diameter is not required to be reduced for reducing the weight of the focusing group. Accordingly, the various aberrations, such as the longitudinal chromatic aberration and the spherical aberration, can be favorably corrected without making the power of the first lens group G1 too high, for example. Note that in each embodiment, the lens component indicates a single lens or a cemented lens.

Preferably, the optical systems OL according to the first embodiment and the second embodiment comprise a stop (aperture stop S) disposed closer to the image surface than the second lens group G2. The stop is thus disposed at the site where the diameter of the light flux is small, thereby allowing the outer diameter of the lens barrel to be small.

Furthermore, it is preferable that the stop (aperture stop S) be disposed closer to the image surface than the third lens group G3. The stop is thus disposed at the site where the diameter of the light flux is small, thereby allowing the outer diameter of the lens barrel to be small.

In the optical systems OL according to the first embodiment and the second embodiment, the second lens group G2 is a first focusing lens group that moves upon focusing. The first focusing lens group may have a positive refractive power, or a negative refractive power. The third lens group G3 is a second focusing lens group that moves upon focusing. The second focusing lens group may have a positive refractive power, or a negative refractive power.

In the optical systems OL according to the first embodiment and the second embodiment, the second lens group G2 is the first focusing lens group that moves upon focusing, and the third lens group G3 is the second focusing lens group that moves upon focusing. One or more lenses that have a positive or negative refractive power may be provided between the first focusing lens group and the second focusing lens group.

Subsequently, referring to FIG. 12, a method for manufacturing the optical system OL according to the first embodiment is schematically described. First, on the optical axis in order from the object, a first lens group G1 having a positive refractive power, a second lens group G2, a third lens group G3, and a fourth lens group G4 are disposed (step ST1). Next, it is configured so that upon focusing from an infinity object to a short distance object, the second lens group G2 and the third lens group G3 move along the optical axis respectively on trajectories different from each other (step ST2). The lenses are disposed in the lens barrel so that the second lens group G2 and the third lens group G3 collectively include three lenses or less. According to such a manufacturing method, the optical system that has an excellent optical performance from focusing on infinity to focusing on the short distance object can be manufactured.

Subsequently, similar to the case of the first embodiment, referring to FIG. 12, a method for manufacturing the optical system OL according to the second embodiment is schematically described. First, on the optical axis in order from the object, a first lens group G1 having a positive refractive power, a second lens group G2, a third lens group G3, and a fourth lens group G4 are disposed (step ST1). Next, it is configured so that upon focusing from an infinity object to a short distance object, the second lens group G2 and the third lens group G3 move along the optical axis respectively on trajectories different from each other (step ST2). The lenses are disposed in the lens barrel so as to satisfy at least the conditional expression (1). According to such a manufacturing method, the optical system that has an excellent optical performance from focusing on infinity to focusing on the short distance object can be manufactured.

EXAMPLES

Hereinafter, optical systems OL according to Examples of each embodiment are described with reference to the drawings. FIGS. 1, 3, 5, 7 and 9 are sectional views showing the configurations and refractive power allocations of the optical systems OL {OL(1) to OL(5)} according to First to Fifth Examples. In the sectional views of the optical systems OL(1) to OL(5) according to First to Fifth Examples, the moving directions of the second lens group and the third lens group along the optical axis upon focusing from infinity to the short distance object are indicated by arrows accompanied by characters of "FOCUSING". The moving direction of part of the fourth lens group that serves as a vibration-proof group during image blur correction is indicated by an arrow accompanied by characters of "VIBRATION-PROOF".

In FIGS. 1, 3, 5, 7 and 9, each lens group is represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently for each Example. Accordingly, even when the same combination of a symbol and a numeral is used among Examples, such usage does not necessarily mean the same configuration.

Hereinafter, Tables 1 to 5 are shown. Among these tables, Table 1 is a table showing each data item in First Example, Table 2 is that in Second Example, Table 3 is that in Third Example, Table 4 is that in Fourth Example, and Table 5 is that in Fifth Example. In each Example, for calculation of aberration characteristics, d-line (wavelength $\lambda$=587.6 nm), and g-line (wavelength $\lambda$=435.8 nm) are selected.

In the table of [General Data], f indicates the focal length of the entire lens system, FNO indicates the f-number, 2$\omega$ indicates the angle of view (the unit is ° (degree), $\omega$ indicates the half angle of view), and Y indicates the image height. TL indicates a distance obtained by adding Bf to the distance from the lens foremost surface to the lens last surface on the optical axis upon focusing on infinity. Bf indicates the distance (back focus) from the lens last surface to the image surface I on the optical axis upon focusing on infinity. In the table of [General Data], fVR indicates the focal length of the vibration-proof group. Δx2 indicates the amount of movement of the second lens group upon focusing from the infinity object to the short distance object. Δx3 indicates the amount of movement of the third lens group upon focusing from the infinity object to the short distance object. As for the amount of movement of the lens group, the sign of the amount of movement toward the image surface is +, and the sign of the amount of movement toward the object is −. β2 indicates the magnification of the second lens group upon focusing on the infinity object. β3 is the magnification of the third lens group upon focusing on the infinity object.

In the table of [Lens Data], Surface Number indicates the order of the optical surface from the object side along the direction in which the ray travels, R indicates the radius of curvature (the surface whose center of curvature resides on the image side is regarded to have a positive value) of each optical surface, D indicates the surface distance that is the distance on the optical axis from each optical surface to the next optical surface (or the image surface), nd is the refractive index of the material of the optical member for d-line, νd indicates the Abbe number of the material of the optical member with reference to d-line, and θgF is the partial dispersion ratio of the material of the optical member. The radius of curvature "∞" indicates a plane or an opening. (Stop S) indicates an aperture stop S. The description of the air refractive index nd=1.00000 is omitted.

The refractive index of the material of the optical member for g-line (wavelength λ=435.8 nm) is ng, the refractive index of the material of the optical member for F-line (wavelength λ=486.1 nm) is nF, and the refractive index of the material of the optical member for C-line (wavelength λ=656.3 nm) is nC. In this case, the partial dispersion ratio θgF of the material of the optical member is defined by the following expression (A).

$$\theta gF = (ng - nF)/(nF - nC) \quad (A)$$

The table of [Variable Distance Data] shows the surface distance at each surface number i where the surface distance is (Di) in the table of [Lens Data]. In the table of [Variable Distance Data], f indicates the focal length of the entire lens system, and β indicates the photographing magnification.

The table of [Lens Group Data] shows the first surface (the surface closest to the object) and the focal length of each lens group.

Hereinafter, at all the data values, the listed focal length f, radius of curvature R, surface distance D, other lengths and the like are generally represented in "mm" if not otherwise specified. However, even after subjected to proportional scaling in or out, the optical system can achieve equivalent optical performances. Accordingly, the representation is not limited to this example.

The descriptions of the tables so far are common to all Examples. Redundant descriptions are hereinafter omitted.

First Example

First Example is described with reference to FIGS. 1 and 2A and 2B and Table 1. FIG. 1 shows a lens configuration of an optical system according to First Example. The optical system OL(1) according to First Example comprises, in order from the object on the optical axis: a first lens group G1 having a positive refractive power; a second lens group G2 having a positive refractive power; a third lens group G3 having a negative refractive power; and a fourth lens group G4 having a positive refractive power. Upon focusing from the infinity object to the short distance object, the second lens group G2 moves toward the object along the optical axis, the third lens group G3 moves toward the image along the optical axis, and the distance between the neighboring lens groups changes. Note that upon focusing, the first lens group G1 and the fourth lens group G4 are fixed with respect to the image surface I. The aperture stop S is disposed between the third lens group G3 and the fourth lens group G4. The sign (+) or (−) assigned to each lens group symbol indicates the refractive power of the corresponding lens group. This indication similarly applies to all the following Examples.

The first lens group G1 comprises, in order from the object on the optical axis: a biconvex positive lens L11; a positive meniscus lens L12 having a convex surface facing the object; a biconvex positive lens L13; a biconcave negative lens L14; a biconvex positive lens L15; and a cemented lens including a biconcave negative lens L16 and a positive meniscus lens L17 having a convex surface facing the object.

The second lens group G2 consists of a positive meniscus lens L21 having a convex surface facing the object. The third lens group G3 consists of negative meniscus lens L31 having a convex surface facing the object. That is, the second lens group G2 and the third lens group G3 collectively consists of two lenses.

The fourth lens group G4 comprises, in order from the object on the optical axis: a biconcave negative lens L41; a cemented lens including a positive meniscus lens L42 having a concave surface facing the object and a biconcave negative lens L43; a biconvex positive lens L44; a biconvex positive lens L45; a cemented lens including a negative meniscus lens L46 having a convex surface facing the object and a biconvex positive lens L47; and a biconcave negative lens L48. An optical filter FL is disposed between the positive lens L45 and the negative meniscus lens L46 (of the cemented lens) in the fourth lens group G4. An image surface I is disposed on the image side of the fourth lens group G4.

In this Example, the negative lens L41 of the fourth lens group G4, the positive meniscus lens L42, and the negative lens L43 constitute a vibration-proof group that is movable in a direction perpendicular to the optical axis, and correct the displacement (an image blur on the image surface I) of the imaging position due to camera shakes and the like. The positive lens L15 of the first lens group G1 corresponds to a positive lens that satisfies the aforementioned conditional expressions (11) to (13). The positive meniscus lens L12, the positive lens L13 and the positive meniscus lens L17 of the first lens group G1, the positive meniscus lens L21 of the second lens group G2, and the negative lens L43 of the fourth lens group G4 correspond to lenses (specified lenses) that satisfy the conditional expression (14) described above.

The following Table 1 lists values of data on the optical system according to First Example.

TABLE 1

| [General Data] | |
|---|---|
| f = 390.00001 | fVR = −65.65418 |
| FNO = 2.90297 | Δx2 = −11.7496 |
| 2ω = 6.29588 | Δx3 = 7.7093 |
| Y = 21.60 | β2 = 0.63393 |
| TL = 405.3186 | β3 = 2.52874 |
| Bf = 54.0003 | |

TABLE 1-continued

[Lens Data]

| Surface Number | R | D | nd | vd | θgF |
|---|---|---|---|---|---|
| 1 | 439.8093 | 8.2000 | 1.518600 | 69.89 | 0.532 |
| 2 | −1741.2521 | 0.1000 | | | |
| 3 | 222.5379 | 12.0000 | 1.433852 | 95.25 | 0.540 |
| 4 | 1393.9654 | 97.1809 | | | |
| 5 | 139.4073 | 11.0000 | 1.433852 | 95.25 | 0.540 |
| 6 | −380.4635 | 0.1050 | | | |
| 7 | −416.7878 | 3.0000 | 1.683760 | 37.64 | 0.578 |
| 8 | 192.2903 | 59.0562 | | | |
| 9 | 102.4273 | 6.6000 | 1.663820 | 27.35 | 0.632 |
| 10 | −401.4769 | 0.1362 | | | |
| 11 | −360.0793 | 1.8000 | 1.737999 | 32.26 | 0.590 |
| 12 | 58.7393 | 8.8000 | 1.497820 | 82.57 | 0.539 |
| 13 | 1167.4655 | (D13) | | | |
| 14 | 83.8395 | 6.2000 | 1.497820 | 82.57 | 0.539 |
| 15 | 10090.0640 | (D15) | | | |
| 16 | 690.6259 | 1.8000 | 1.755000 | 52.33 | 0.548 |
| 17 | 60.0805 | (D17) | | | |
| 18 | ∞ | 7.0861 | | (Aperture Stop S) | |
| 19 | −246.8276 | 1.8000 | 1.910822 | 35.25 | 0.582 |
| 20 | 116.7166 | 3.8112 | | | |
| 21 | −73.3878 | 4.1000 | 1.846663 | 23.78 | 0.619 |
| 22 | −39.7299 | 1.8000 | 1.497820 | 82.57 | 0.539 |
| 23 | 433.0885 | 4.6000 | | | |
| 24 | 89.2307 | 3.8000 | 1.612660 | 44.46 | 0.564 |
| 25 | −1734.6597 | 40.2586 | | | |
| 26 | 55.6338 | 5.5000 | 1.696800 | 55.52 | 0.543 |
| 27 | −779.8112 | 10.0000 | | | |
| 28 | ∞ | 1.5000 | 1.516800 | 63.88 | 0.536 |
| 29 | ∞ | 0.1000 | | | |
| 30 | 63.5589 | 1.5000 | 1.804000 | 46.60 | 0.557 |
| 31 | 26.0339 | 8.8000 | 1.612660 | 44.46 | 0.564 |
| 32 | −212.3772 | 4.7866 | | | |
| 33 | −69.8293 | 1.5000 | 2.000694 | 25.46 | 0.614 |
| 34 | 198.2621 | Bf | | | |

[Variable Distance Data]

| | Upon focusing on infinity f = 390.00001 | Upon focusing on an intermediate distance object β = −0.0333 | Upon focusing on a very short distance object β = −0.1682 |
|---|---|---|---|
| D13 | 16.0689 | 13.7323 | 23.5588 |
| D15 | 4.1000 | 8.0022 | 23.4588 |
| D17 | 14.2286 | 12.6630 | 6.5193 |

[Lens Group Data]

| Group | First surface | Focal length |
|---|---|---|
| G1 | 1 | 282.01395 |
| G2 | 14 | 169.78939 |
| G3 | 16 | −87.26627 |
| G4 | 19 | 310.88872 |

Figure 2A:
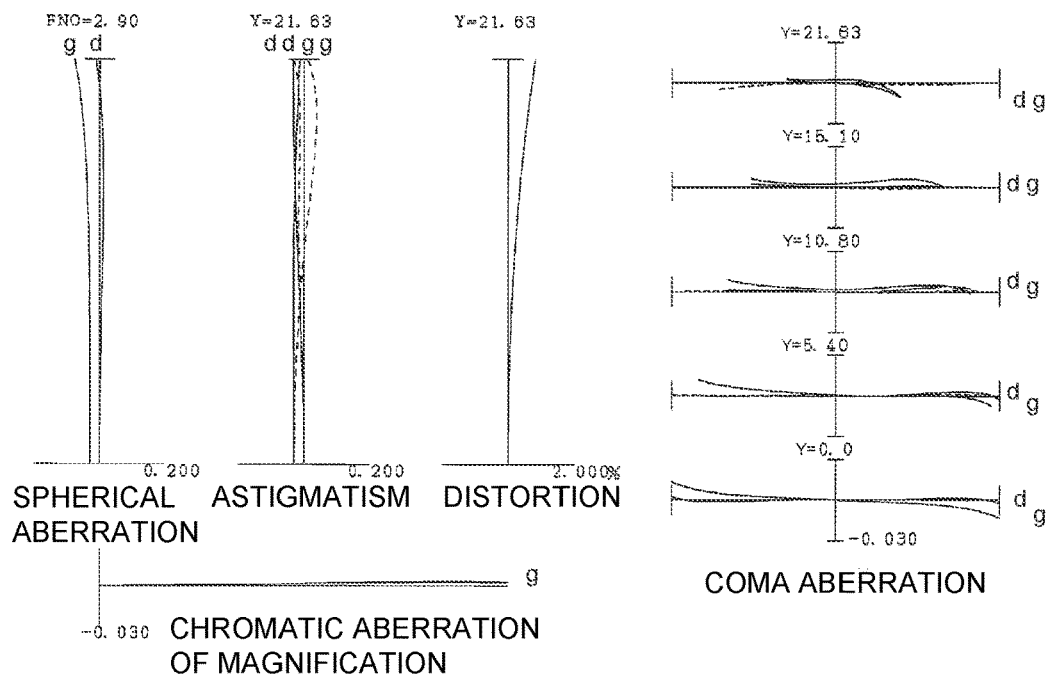
FIGS. 2A and 2B are various aberration graphs of the optical system according to First Example upon focusing on infinity and upon focusing on a short distance object.
Figure 2B:
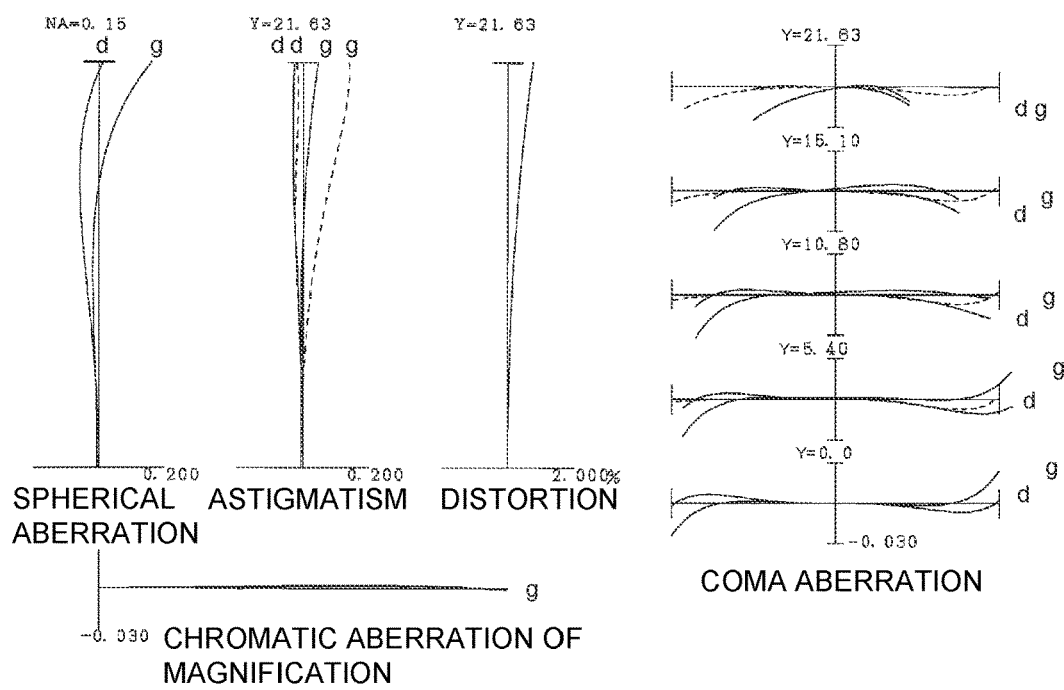

FIG. 2A shows graphs of various aberrations of an optical system upon focusing on infinity according to First Example. FIG. 2B shows graphs of various aberrations of the optical system upon focusing on the short distance object according to First Example. In each aberration graph upon focusing on infinity, FNO indicates the f-number, and Y indicates the image height. In each aberration graph upon focusing on the short distance object, NA indicates the numerical aperture, and Y indicates the image height. Note that the spherical aberration graph indicates the value of the f-number or the numerical aperture that corresponds to the maximum aperture. The astigmatism graph and the distortion graph each indicate the maximum value of the image height. The coma aberration graph indicates the value of the corresponding image height. The symbol d indicates d-line (wavelength λ=587.6 nm). The symbol g indicates g-line (wavelength λ=435.8 nm). In the astigmatism graph, a solid line indicates a sagittal image surface, and a broken line indicates a meridional image surface. Note that also in the aberration graphs in the following Examples, symbols similar to those in this Example are used, and redundant description is omitted.

The various aberration graphs show that in the optical system according to First Example, over the entire range from focusing on infinity to focusing on the short distance object, the various aberrations are favorably corrected, and an excellent imaging performance is achieved.

Second Example

Figure 3:
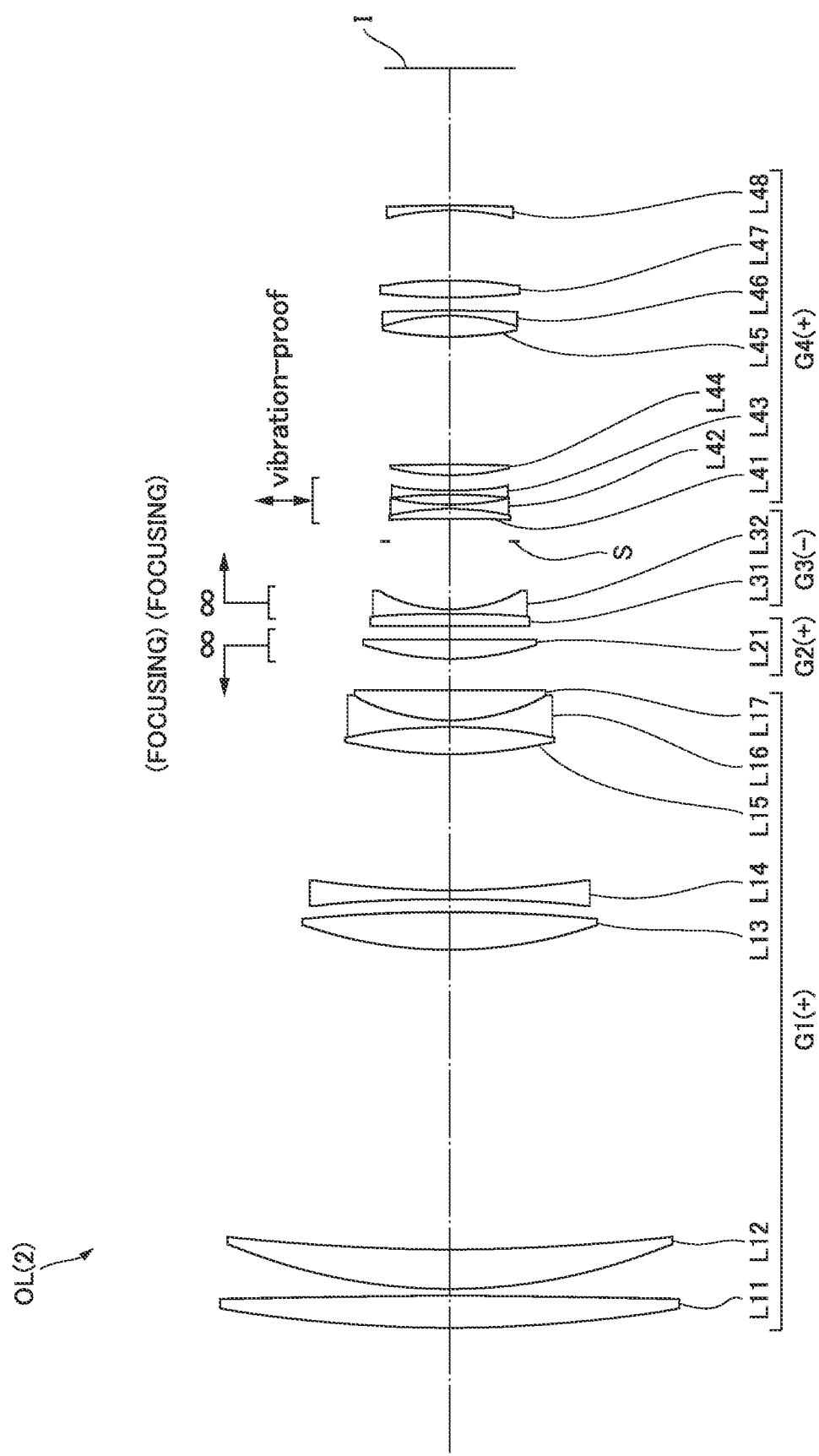
FIG. 3 shows a lens configuration of an optical system according to Second Example.

Second Example is described with reference to FIGS. 3 and 4A and 4B and Table 2. FIG. 3 shows a lens configuration of an optical system according to Second Example. The optical system OL(2) according to Second Example comprises, in order from the object on the optical axis: a first lens group G1 having a positive refractive power; a second lens group G2 having a positive refractive power; a third lens group G3 having a negative refractive power; and a fourth lens group G4 having a positive refractive power. Upon focusing from the infinity object to the short distance object, the second lens group G2 moves toward the object along the optical axis, the third lens group G3 moves toward the image along the optical axis, and the distance between the neighboring lens groups changes. Note that upon focusing, the first lens group G1 and the fourth lens group G4 are fixed with respect to the image surface I. The aperture stop S is disposed between the third lens group G3 and the fourth lens group G4.

The first lens group G1 comprises, in order from the object on the optical axis: a biconvex positive lens L11; a positive meniscus lens L12 having a convex surface facing the object; a biconvex positive lens L13; a biconcave negative lens L14; a biconvex positive lens L15; and a cemented lens including a biconcave negative lens L16 and a positive meniscus lens L17 having a convex surface facing the object.

The second lens group G2 comprises a biconvex positive lens L21. The third lens group G3 comprises, in order from the object, a cemented lens (having a negative refractive power) that includes a positive meniscus lens L31 having a concave surface facing the object, and a biconcave negative lens L32. That is, the second lens group G2 and the third lens group G3 collectively include three lenses.

The fourth lens group G4 comprises, in order from the object on the optical axis: a cemented lens including a positive meniscus lens L41 having a concave surface facing the object and a biconcave negative lens L42; a biconcave negative lens L43; a biconvex positive lens L44; a cemented lens including a biconvex positive lens L45 and a negative meniscus lens L46 having a concave surface facing the object; a biconvex positive lens L47; and a negative meniscus lens L48 having a concave surface facing the object. An image surface I is disposed on the image side of the fourth lens group G4.

In this Example, the positive meniscus lens L41, the negative lens L42 and the negative lens L43 of the fourth lens group G4 constitute a vibration-proof group that is movable in a direction perpendicular to the optical axis, and correct the displacement (an image blur on the image surface I) of the imaging position due to camera shakes and the like.

The positive lens L15 of the first lens group G1 corresponds to a positive lens that satisfies the aforementioned conditional expressions (11) to (13). The positive meniscus lens L12, the positive lens L13 and the positive meniscus lens L17 of the first lens group G1 correspond to lenses (specified lenses) that satisfy the conditional expression (14) described above.

The following Table 2 lists values of data on the optical system according to Second Example.

TABLE 2

[General Data]

| f = 389.99986 | fVR = −63.58427 |
|---|---|
| FNO = 2.90000 | Δx2 = −5.0000 |
| 2ω = 6.31216 | Δx3 = 11.7806 |
| Y = 21.60 | β2 = 0.50377 |
| TL = 374.8074 | β3 = 2.39339 |
| Bf = 40.8074 | |

[Lens Data]

| Surface Number | R | D | nd | vd | θgF |
|---|---|---|---|---|---|
| 1 | 411.5072 | 9.6000 | 1.518600 | 69.89 | 0.532 |
| 2 | −1780.5743 | 2.0000 | | | |
| 3 | 176.8633 | 11.9000 | 1.433837 | 95.16 | 0.539 |
| 4 | 650.5128 | 88.9014 | | | |
| 5 | 139.4073 | 11.2000 | 1.433837 | 95.16 | 0.539 |
| 6 | −454.4554 | 3.8410 | | | |
| 7 | −416.7878 | 2.7000 | 1.770470 | 29.74 | 0.595 |
| 8 | 280.1935 | 40.5654 | | | |
| 9 | 144.0688 | 8.0000 | 1.663820 | 27.35 | 0.632 |
| 10 | −152.3486 | 0.1000 | | | |
| 11 | −156.0200 | 1.8000 | 1.749504 | 35.33 | 0.582 |
| 12 | 58.8242 | 9.0000 | 1.437001 | 95.10 | 0.534 |
| 13 | 808693.5500 | (D13) | | | |
| 14 | 80.8416 | 6.0000 | 1.593190 | 67.90 | 0.544 |
| 15 | −1732.6760 | (D15) | | | |
| 16 | −1283.1947 | 3.5000 | 1.850260 | 32.35 | 0.595 |
| 17 | −277.4866 | 1.5000 | 1.517420 | 52.20 | 0.558 |
| 18 | 45.9700 | (D18) | | | |
| 19 | ∞ | 6.6883 | | (Aperture Stop S) | |
| 20 | −769.1919 | 3.0000 | 1.805181 | 25.46 | 0.616 |
| 21 | −74.8338 | 1.2000 | 1.593190 | 67.90 | 0.544 |
| 22 | 88.8291 | 2.9101 | | | |
| 23 | −151.9699 | 1.2000 | 1.755000 | 52.33 | 0.548 |
| 24 | 133.0301 | 4.6000 | | | |
| 25 | 78.5763 | 3.0000 | 1.654115 | 39.68 | 0.574 |
| 26 | −531.2778 | 38.2139 | | | |
| 27 | 106.4326 | 6.2000 | 1.654115 | 39.68 | 0.574 |
| 28 | −65.3375 | 1.5000 | 1.922859 | 20.88 | 0.628 |
| 29 | −494.2887 | 3.9085 | | | |
| 30 | 214.9436 | 5.0000 | 1.770470 | 29.74 | 0.595 |
| 31 | −127.9388 | 20.8915 | | | |
| 32 | −77.1790 | 1.5000 | 1.902650 | 35.77 | 0.581 |
| 33 | −511.7909 | Bf | | | |

[Variable Distance Data]

| | Upon focusing on infinity f = 389.99986 | Upon focusing on an intermediate distance object β = −0.0333 | Upon focusing on a very short distance object β = −0.1699 |
|---|---|---|---|
| D13 | 9.4718 | 8.7870 | 4.4718 |
| D15 | 4.0000 | 7.1614 | 20.7806 |
| D18 | 20.1082 | 17.6315 | 8.3276 |

TABLE 2-continued

[Lens Group Data]

| Group | First surface | Focal length |
|---|---|---|
| G1 | 1 | 341.63982 |
| G2 | 14 | 130.36832 |
| G3 | 16 | −93.23698 |
| G4 | 20 | 491.53462 |

Figure 4A:
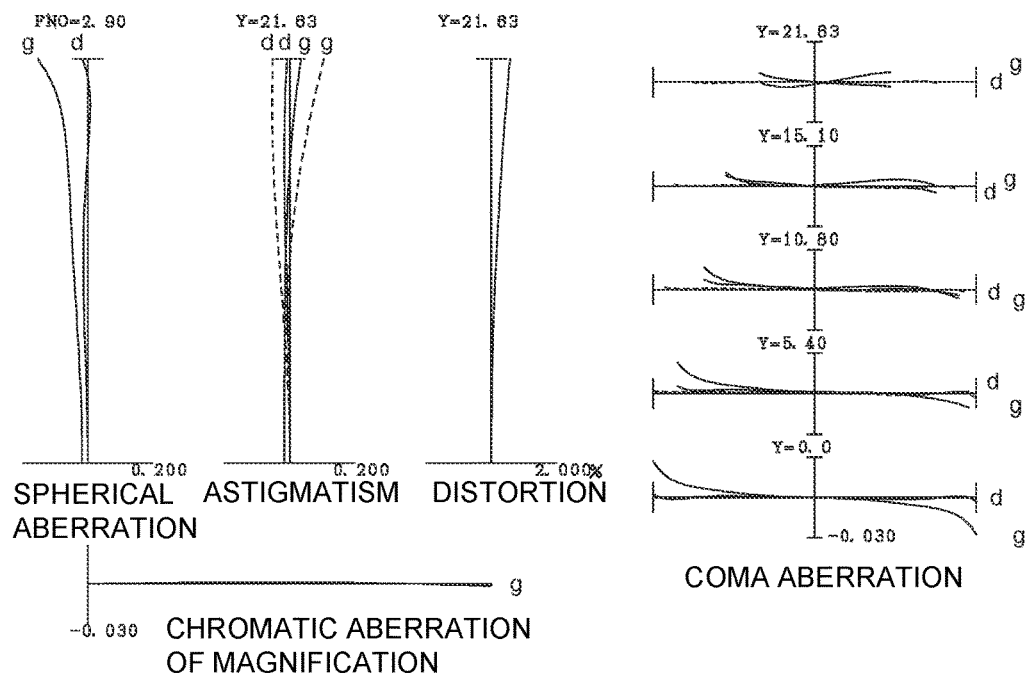
FIGS. 4A and 4B are various aberration graphs of the optical system according to Second Example upon focusing on infinity and upon focusing on a short distance object.
Figure 4B:
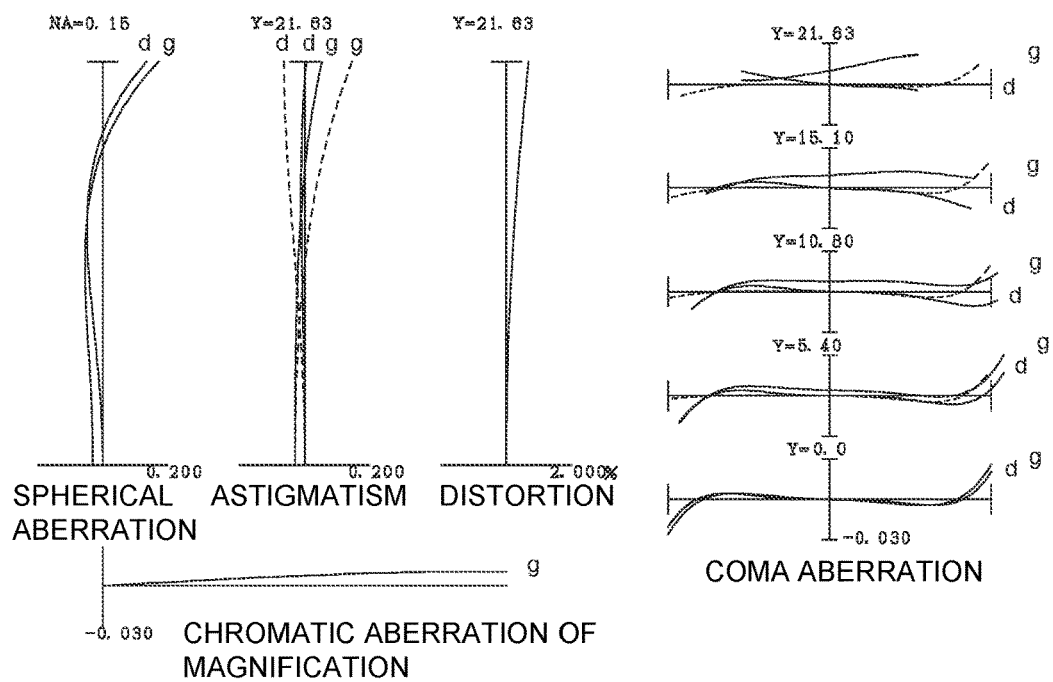

FIG. 4A shows graphs of various aberrations of an optical system upon focusing on infinity according to Second Example. FIG. 4B shows graphs of various aberrations of the optical system upon focusing on the short distance object according to Second Example. The various aberration graphs show that in the optical system according to Second Example, over the entire range from focusing on infinity to focusing on the short distance object, the various aberrations are favorably corrected, and an excellent imaging performance is achieved.

Third Example

Figure 5:
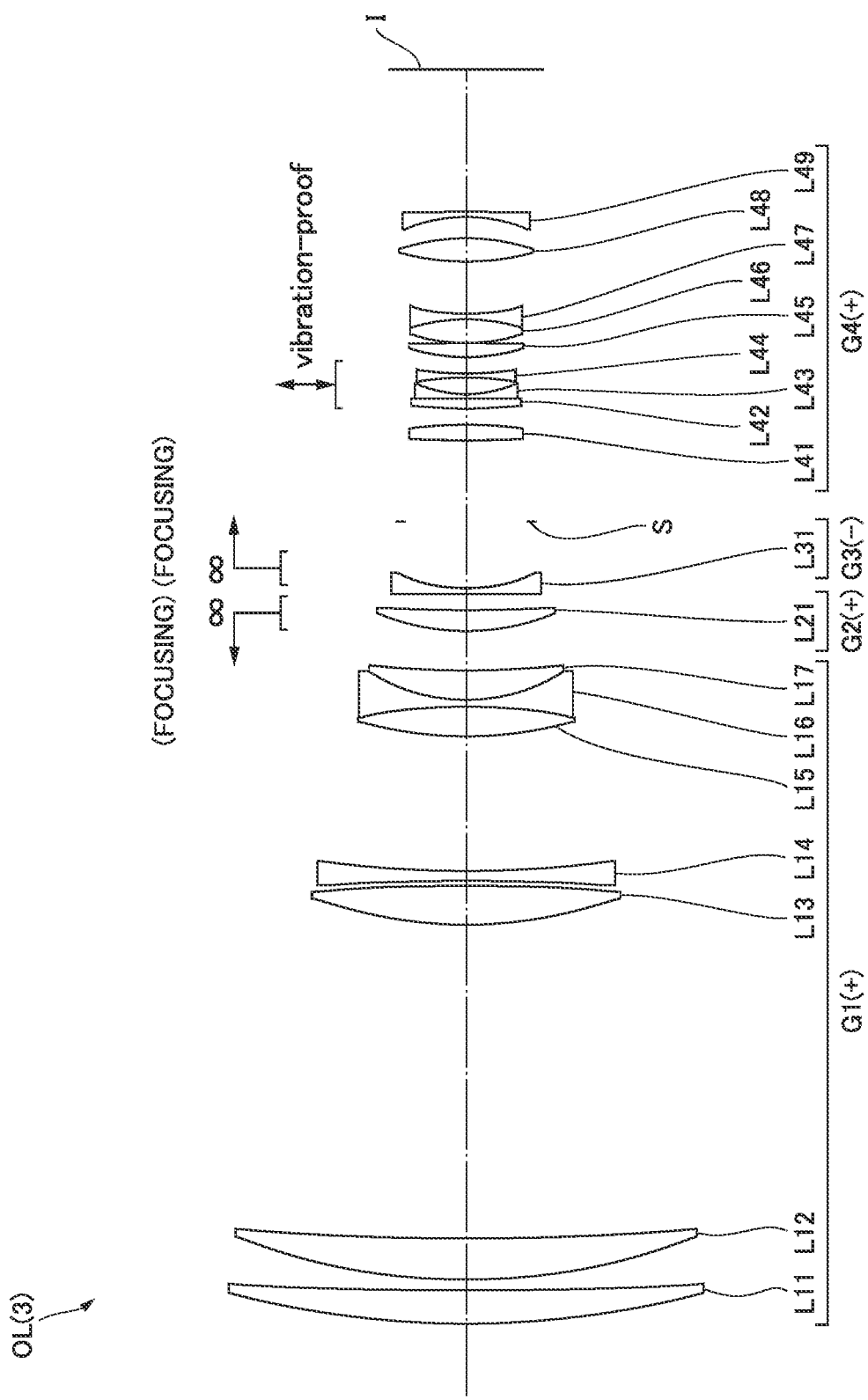
FIG. 5 shows a lens configuration of an optical system according to Third Example.

Third Example is described with reference to FIGS. 5 and 6A and 6B and Table 3. FIG. 5 shows a lens configuration of an optical system upon focusing on infinity according to Third Example. The optical system OL(3) according to Third Example comprises, in order from the object on the optical axis: a first lens group G1 having a positive refractive power; a second lens group G2 having a positive refractive power; a third lens group G3 having a negative refractive power; and a fourth lens group G4 having a positive refractive power. Upon focusing from the infinity object to the short distance object, the second lens group G2 moves toward the object along the optical axis, the third lens group G3 moves toward the image along the optical axis, and the distance between the neighboring lens groups changes. Note that upon focusing, the first lens group G1 and the fourth lens group G4 are fixed with respect to the image surface I. The aperture stop S is disposed between the third lens group G3 and the fourth lens group G4.

The first lens group G1 comprises, in order from the object on the optical axis: a positive meniscus lens L11 having a convex surface facing the object; a positive meniscus lens L12 having a convex surface facing the object; a biconvex positive lens L13; a biconcave negative lens L14; a biconvex positive lens L15; and a cemented lens including a biconcave negative lens L16 and a positive meniscus lens L17 having a convex surface facing the object.

The second lens group G2 consists of a positive meniscus lens L21 having a convex surface facing the object. The third lens group G3 consists of a negative meniscus lens L31 having a convex surface facing the object. That is, the second lens group G2 and the third lens group G3 collectively consists of two lenses.

The fourth lens group G4 comprises, in order from the object on the optical axis: a biconvex positive lens L41; a cemented lens including a biconvex positive lens L42 and a biconcave negative lens L43; a biconcave negative lens L44; a biconvex positive lens L45; a cemented lens including a biconvex positive lens L46 and a biconcave negative lens L47; a biconvex positive lens L48; and a negative meniscus lens L49 having a concave surface facing the object. An image surface I is disposed on the image side of the fourth lens group G4.

In this Example, the positive lens L42, the negative lens L43 and the negative lens L44 of the fourth lens group G4 constitute a vibration-proof group that is movable in a direction perpendicular to the optical axis, and correct the displacement (an image blur on the image surface I) of the imaging position due to camera shakes and the like. The positive lens L15 of the first lens group G1 corresponds to a positive lens that satisfies the aforementioned conditional expressions (11) to (13). The positive meniscus lens L12, the positive lens L13 and the positive meniscus lens L17 of the first lens group G1 correspond to lenses (specified lenses) that satisfy the conditional expression (14) described above.

The following Table 3 lists values of data on the optical system according to Third Example.

TABLE 3

[General Data]

| f = 389.99987 | fVR = −43.21297 |
|---|---|
| FNO = 2.93355 | Δx2 = −5.0178 |
| | Δx3 = 10.3311 |
| | β2 = 0.54598 |
| 2ω = 6.31206 | β3 = 3.37032 |
| Y = 21.63 | |
| TL = 357.8074 | |
| Bf = 40.8075 | |

[Lens Data]

| Surface Number | R | D | nd | vd | θgF |
|---|---|---|---|---|---|
| 1 | 274.6094 | 9.6000 | 1.518600 | 69.89 | 0.532 |
| 2 | 1444.1407 | 3.0000 | | | |
| 3 | 189.5245 | 11.9000 | 1.433837 | 95.16 | 0.539 |
| 4 | 876.8340 | 89.3809 | | | |
| 5 | 139.4073 | 11.2000 | 1.433837 | 95.16 | 0.539 |
| 6 | −496.1675 | 1.4595 | | | |
| 7 | −541.6390 | 2.7000 | 1.770470 | 29.74 | 0.595 |
| 8 | 350.5591 | 38.4092 | | | |
| 9 | 122.5377 | 8.4000 | 1.663820 | 27.35 | 0.632 |
| 10 | −159.9948 | 0.1000 | | | |
| 11 | −161.0621 | 1.8000 | 1.720467 | 34.71 | 0.583 |
| 12 | 53.9862 | 8.5000 | 1.437001 | 95.10 | 0.534 |
| 13 | 268.4116 | (D13) | | | |
| 14 | 69.4230 | 6.0000 | 1.593190 | 67.90 | 0.544 |
| 15 | 529.0836 | (D15) | | | |
| 16 | 11438.0050 | 1.5000 | 1.696800 | 55.52 | 0.543 |
| 17 | 50.3745 | (D17) | | | |
| 18 | ∞ | 22.9851 | | (Aperture Stop S) | |
| 19 | 497.7845 | 4.5000 | 1.729160 | 54.61 | 0.544 |
| 20 | −104.8775 | 4.5000 | | | |
| 21 | 135.7675 | 3.0000 | 1.922859 | 20.88 | 0.628 |
| 22 | −574.7517 | 1.2000 | 1.593190 | 67.90 | 0.544 |
| 23 | 36.8702 | 4.6409 | | | |
| 24 | −98.5151 | 1.2000 | 1.729160 | 54.61 | 0.544 |
| 25 | 106.1474 | 4.6000 | | | |
| 26 | 54.3694 | 4.0000 | 1.654115 | 39.68 | 0.574 |
| 27 | −1515.8814 | 0.1000 | | | |
| 28 | 53.4516 | 6.7000 | 1.620040 | 36.40 | 0.588 |
| 29 | −53.9119 | 1.5000 | 1.808090 | 22.74 | 0.629 |
| 30 | 71.0492 | 15.0246 | | | |
| 31 | 79.3722 | 6.5000 | 1.770470 | 29.74 | 0.595 |
| 32 | −62.5659 | 6.1388 | | | |
| 33 | −46.9005 | 1.5000 | 1.903658 | 31.31 | 0.595 |
| 34 | −495.5352 | Bf | | | |

TABLE 3-continued

[Variable Distance Data]

| | Upon focusing on infinity f = 389.99987 | Upon focusing on an intermediate distance object β = −0.0333 | Upon focusing on a very short distance object β = −0.1714 |
|---|---|---|---|
| D13 | 11.4406 | 10.6069 | 6.4228 |
| D15 | 4.5919 | 7.4922 | 19.9407 |
| D17 | 18.9286 | 16.8620 | 8.5975 |

[Lens Group Data]

| Group | First surface | Focal length |
|---|---|---|
| G1 | 1 | 310.67557 |
| G2 | 14 | 134.05749 |
| G3 | 16 | −72.61779 |
| G4 | 19 | 266.10963 |

Figure 6A:
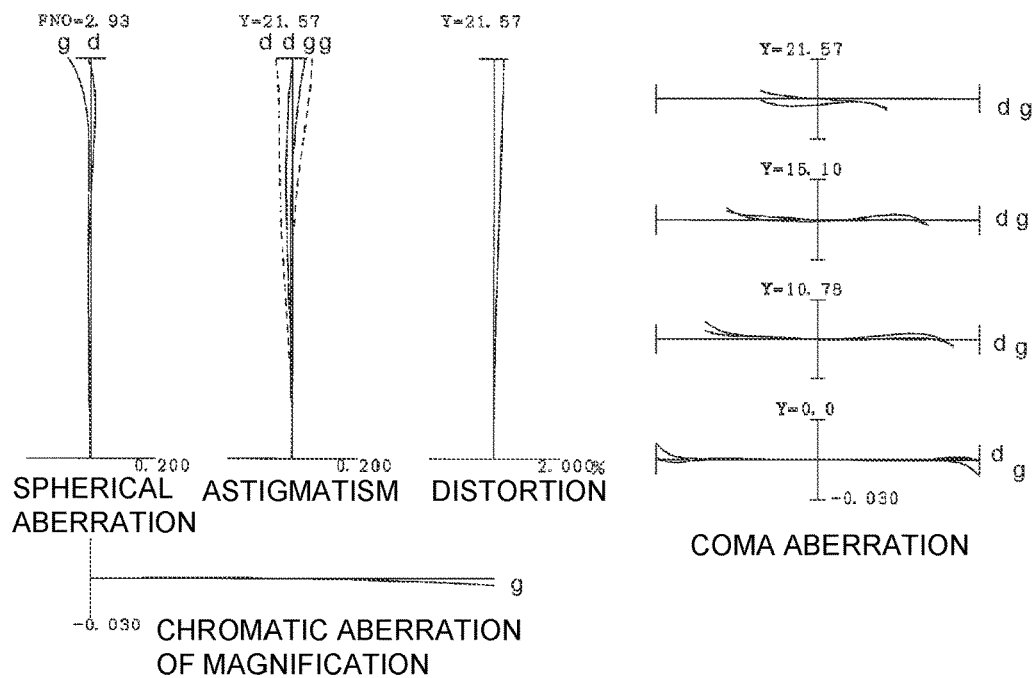
FIGS. 6A and 6B are various aberration graphs of the optical system according to Third Example upon focusing on infinity and upon focusing on a short distance object.
Figure 6B:
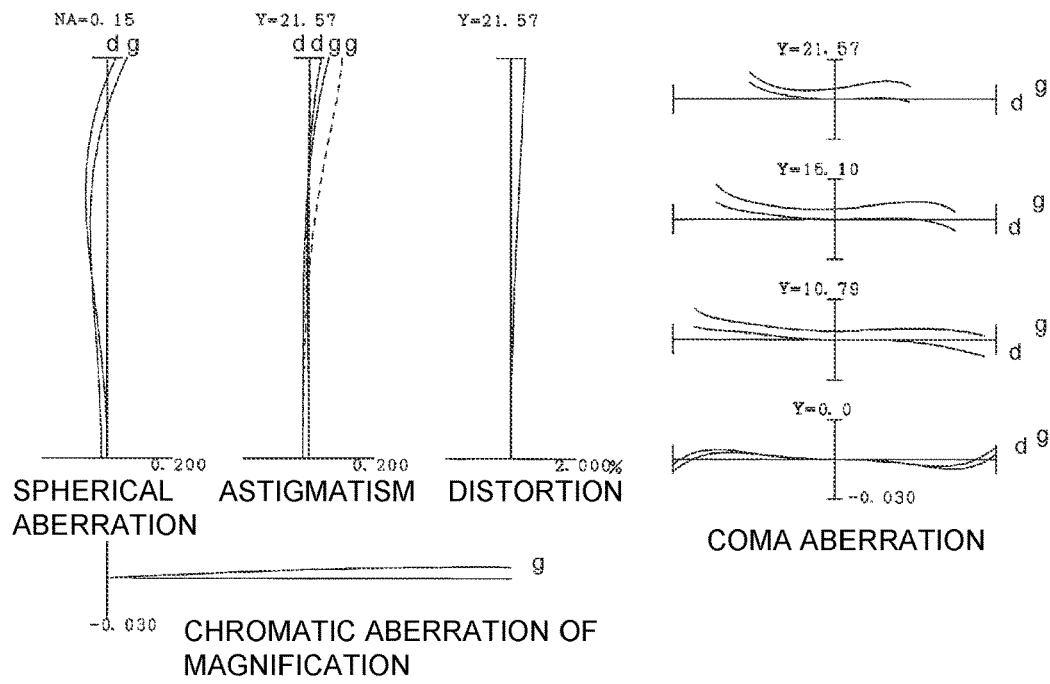

FIG. 6A shows graphs of various aberrations of an optical system upon focusing on infinity according to Third Example. FIG. 6B shows graphs of various aberrations of the optical system upon focusing on the short distance object according to Third Example. The various aberration graphs show that in the optical system according to Third Example, over the entire range from focusing on infinity to focusing on the short distance object, the various aberrations are favorably corrected, and an excellent imaging performance is achieved.

Fourth Example

Figure 7:
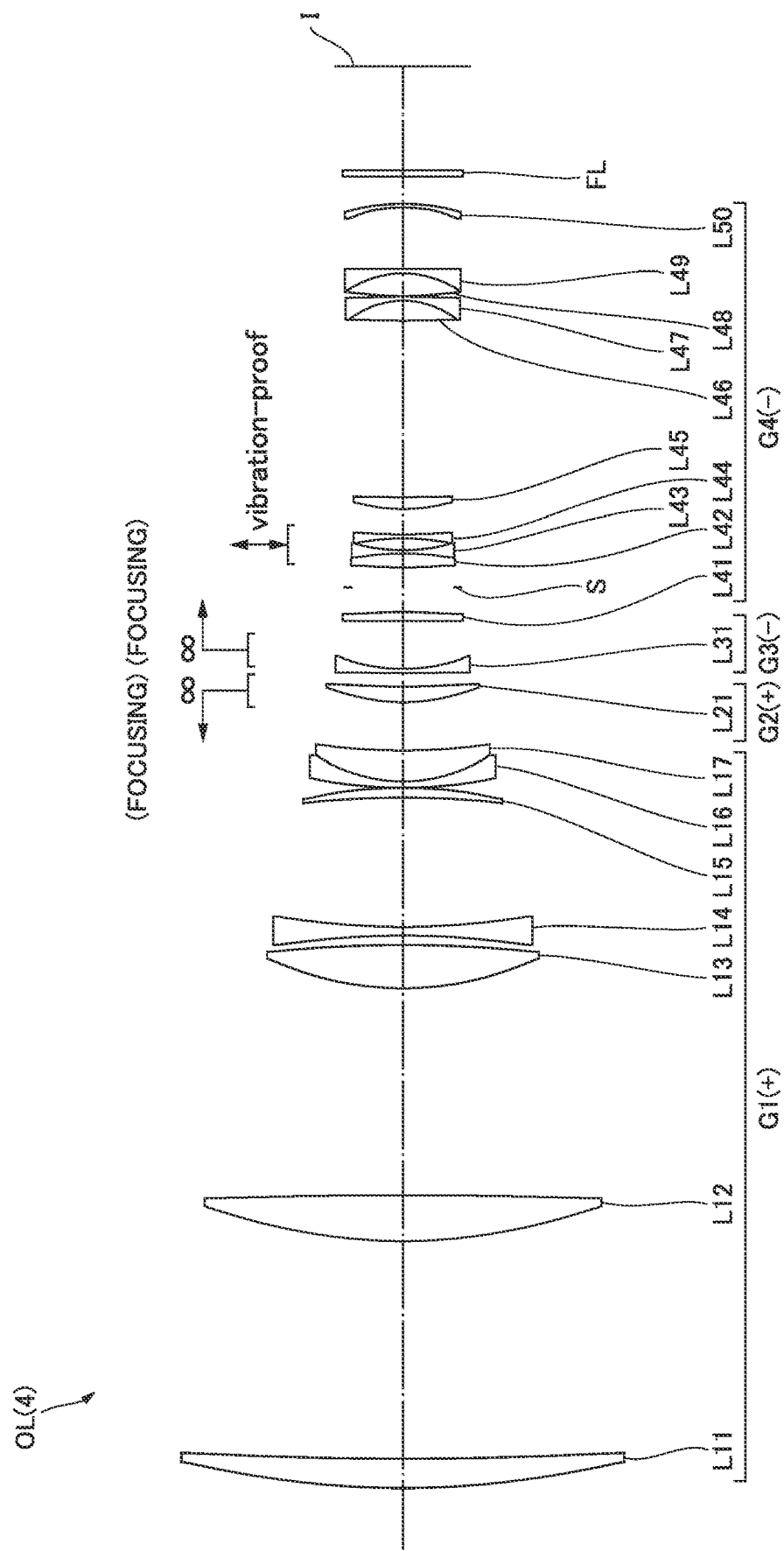
FIG. 7 shows a lens configuration of an optical system according to Fourth Example.

Fourth Example is described with reference to FIGS. 7 and FIGS. 8A and 8B and Table 4. FIG. 7 shows a lens configuration of an optical system upon focusing on infinity according to Fourth Example. The optical system OL(4) according to Fourth Example comprises, in order from the object on the optical axis: a first lens group G1 having a positive refractive power; a second lens group G2 having a positive refractive power; a third lens group G3 having a negative refractive power; and a fourth lens group G4 having a negative refractive power. Upon focusing from the infinity object to the short distance object, the second lens group G2 moves toward the object along the optical axis, the third lens group G3 moves toward the image along the optical axis, and the distance between the neighboring lens groups changes. Note that upon focusing, the first lens group G1 and the fourth lens group G4 are fixed with respect to the image surface I. The aperture stop S is disposed in the fourth lens group G4.

The first lens group G1 comprises, in order from the object on the optical axis: a positive meniscus lens L11 having a convex surface facing the object; a biconvex positive lens L12; a biconvex positive lens L13; a biconcave negative lens L14; a positive meniscus lens L15 having a concave surface facing the object; and a cemented lens including a negative meniscus lens L16 having a convex surface facing the object and a positive meniscus lens L17 having a convex surface facing the object.

The second lens group G2 consists of a positive meniscus lens L21 having a convex surface facing the object. The third lens group G3 consists of a negative meniscus lens L31 having a convex surface facing the object. That is, the second lens group G2 and the third lens group G3 collectively consists of two lenses.

The fourth lens group G4 comprises, in order from the object on the optical axis: a biconvex positive lens L41; a cemented lens including a biconvex positive lens L42 and a biconcave negative lens L43; a biconcave negative lens L44; a biconvex positive lens L45; a cemented lens including a biconvex positive lens L46 and a negative meniscus lens L47 having a concave surface facing the object; a cemented lens including a biconvex positive lens L48 and a negative meniscus lens L49 having a concave surface facing the object; and a negative meniscus lens L50 having a concave surface facing the object. The aperture stop S is disposed between the positive lens L41 and the positive lens L42 (of the cemented lens) in the fourth lens group G4. An image surface I is disposed on the image side of the fourth lens group G4. An optical filter FL is disposed between the negative meniscus lens L50 in the fourth lens group G4 and the image surface I.

In this Example, the positive lens L42, the negative lens L43 and the negative lens L44 of the fourth lens group G4 constitute a vibration-proof group that is movable in a direction perpendicular to the optical axis, and correct the displacement (an image blur on the image surface I) of the imaging position due to camera shakes and the like. The positive meniscus lens L15 of the first lens group G1 corresponds to a positive lens that satisfies the aforementioned conditional expressions (11) to (13). The positive lens L12, the positive lens L13 and the positive meniscus lens L17 of the first lens group G1, and the negative meniscus lens L49 of the fourth lens group G4 correspond to lenses (specified lenses) that satisfy the conditional expression (14) described above.

The following Table 4 lists values of data on the optical system according to Fourth Example.

TABLE 4

[General Data]

| | |
|---|---|
| f = 587.99970 | fVR = −61.09024 |
| FNO = 4.09990 | Δx2 = −9.2038 |
| 2ω = 4.15318 | Δx3 = 2.0000 |
| Y = 21.70 | β2 = 0.53805 |
| TL = 457.9999 | β3 = 3.07318 |
| Bf = 33.4999 | |

[Lens Data]

| Surface Number | R | D | nd | vd | θgF |
|---|---|---|---|---|---|
| 1 | 320.0114 | 9.4987 | 1.487490 | 70.32 | 0.529 |
| 2 | 1556.2771 | 70.0000 | | | |
| 3 | 200.0000 | 14.7065 | 1.433837 | 95.16 | 0.539 |
| 4 | −1850.8679 | 66.5961 | | | |
| 5 | 112.1065 | 14.0539 | 1.433837 | 95.16 | 0.539 |
| 6 | −411.9826 | 3.0994 | | | |
| 7 | −271.7122 | 2.6000 | 1.749504 | 35.33 | 0.582 |
| 8 | 273.2070 | 41.9524 | | | |
| 9 | −276.2752 | 2.9954 | 1.663820 | 27.35 | 0.632 |
| 10 | −151.1038 | 0.1000 | | | |
| 11 | 165.8791 | 1.9000 | 1.804400 | 39.61 | 0.572 |
| 12 | 56.1791 | 10.0000 | 1.437001 | 95.10 | 0.534 |
| 13 | 246.7321 | (D13) | | | |
| 14 | 72.7085 | 5.0000 | 1.627496 | 59.24 | 0.556 |
| 15 | 437.2023 | (D15) | | | |
| 16 | 608.4245 | 1.4000 | 1.804400 | 39.61 | 0.572 |
| 17 | 59.2420 | (D17) | | | |
| 18 | 1662.7369 | 3.0000 | 1.808090 | 22.74 | 0.629 |
| 19 | −268.2959 | 7.9411 | | | |
| 20 | ∞ | 6.5000 | (Aperture Stop S) | | |

TABLE 4-continued

| 21 | 173.1949 | 4.4983 | 1.846663 | 23.78 | 0.619 |
|---|---|---|---|---|---|
| 22 | −93.9126 | 1.2000 | 1.755000 | 52.33 | 0.548 |
| 23 | 68.9486 | 3.7146 | | | |
| 24 | −79.9737 | 1.2000 | 1.729160 | 54.61 | 0.544 |
| 25 | 319.8993 | 8.0984 | | | |
| 26 | 65.6157 | 3.8964 | 1.647690 | 33.72 | 0.593 |
| 27 | −6303.3612 | 57.0554 | | | |
| 28 | 1057.7056 | 6.4549 | 1.770470 | 29.74 | 0.595 |
| 29 | −30.5390 | 1.2600 | 1.922860 | 20.88 | 0.639 |
| 30 | −363.6860 | 0.1000 | | | |
| 31 | 143.0814 | 7.4994 | 1.595510 | 39.21 | 0.581 |
| 32 | −33.2229 | 1.2000 | 1.497820 | 82.57 | 0.539 |
| 33 | −1263.0104 | 19.8180 | | | |
| 34 | −48.8063 | 1.2000 | 1.848500 | 43.79 | 0.562 |
| 35 | −70.0018 | 8.7649 | | | |
| 36 | ∞ | 2.0000 | 1.516800 | 64.13 | 0.536 |
| 37 | ∞ | Bf | | | |

[Variable Distance Data]

| | Upon focusing on infinity f = 587.99970 | Upon focusing on an intermediate distance object β = −0.0333 | Upon focusing on a very short distance object β = −0.1450 |
|---|---|---|---|
| D13 | 15.5701 | 13.4060 | 6.3663 |
| D15 | 4.2356 | 6.8823 | 15.4394 |
| D17 | 15.3905 | 14.9079 | 13.3905 |

[Lens Group Data]

| Group | First surface | Focal length |
|---|---|---|
| G1 | 1 | 348.13120 |
| G2 | 14 | 138.25340 |
| G3 | 16 | −81.68490 |
| G4 | 18 | −6571.80060 |

Figure 8A:
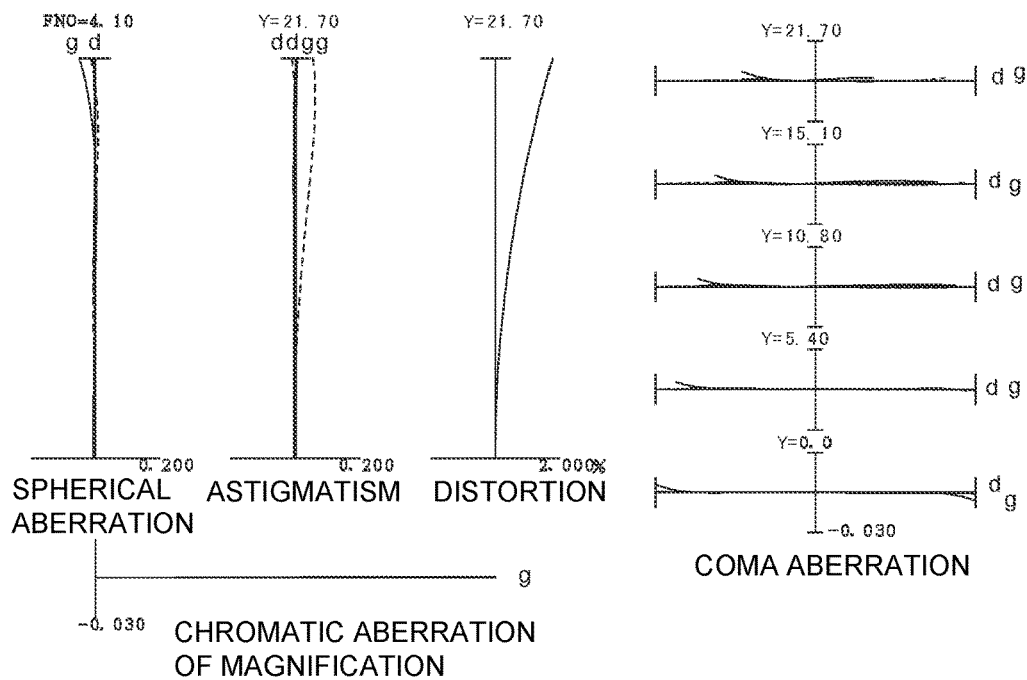
FIGS. 8A and 8B are various aberration graphs of the optical system according to Fourth Example upon focusing on infinity and upon focusing on a short distance object.
Figure 8B:
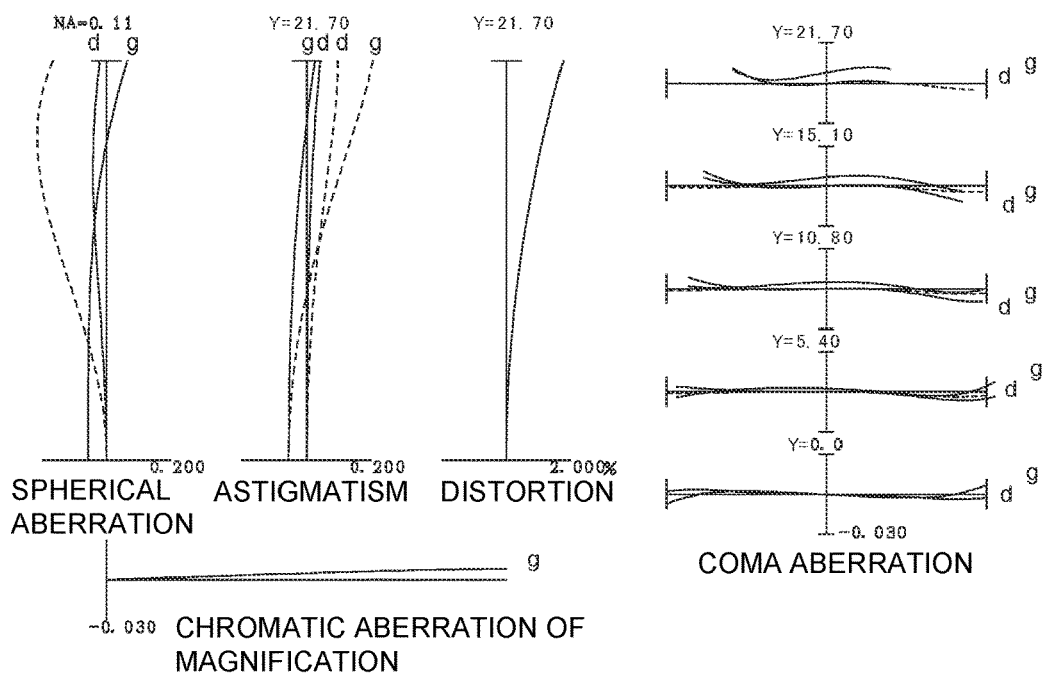

FIG. 8A shows graphs of various aberrations of an optical system upon focusing on infinity according to Fourth Example. FIG. 8B shows graphs of various aberrations of the optical system upon focusing on the short distance object according to Fourth Example. The various aberration graphs show that in the optical system according to Fourth Example, over the entire range from focusing on infinity to focusing on the short distance object, the various aberrations are favorably corrected, and an excellent imaging performance is achieved.

Fifth Example

Figure 9:
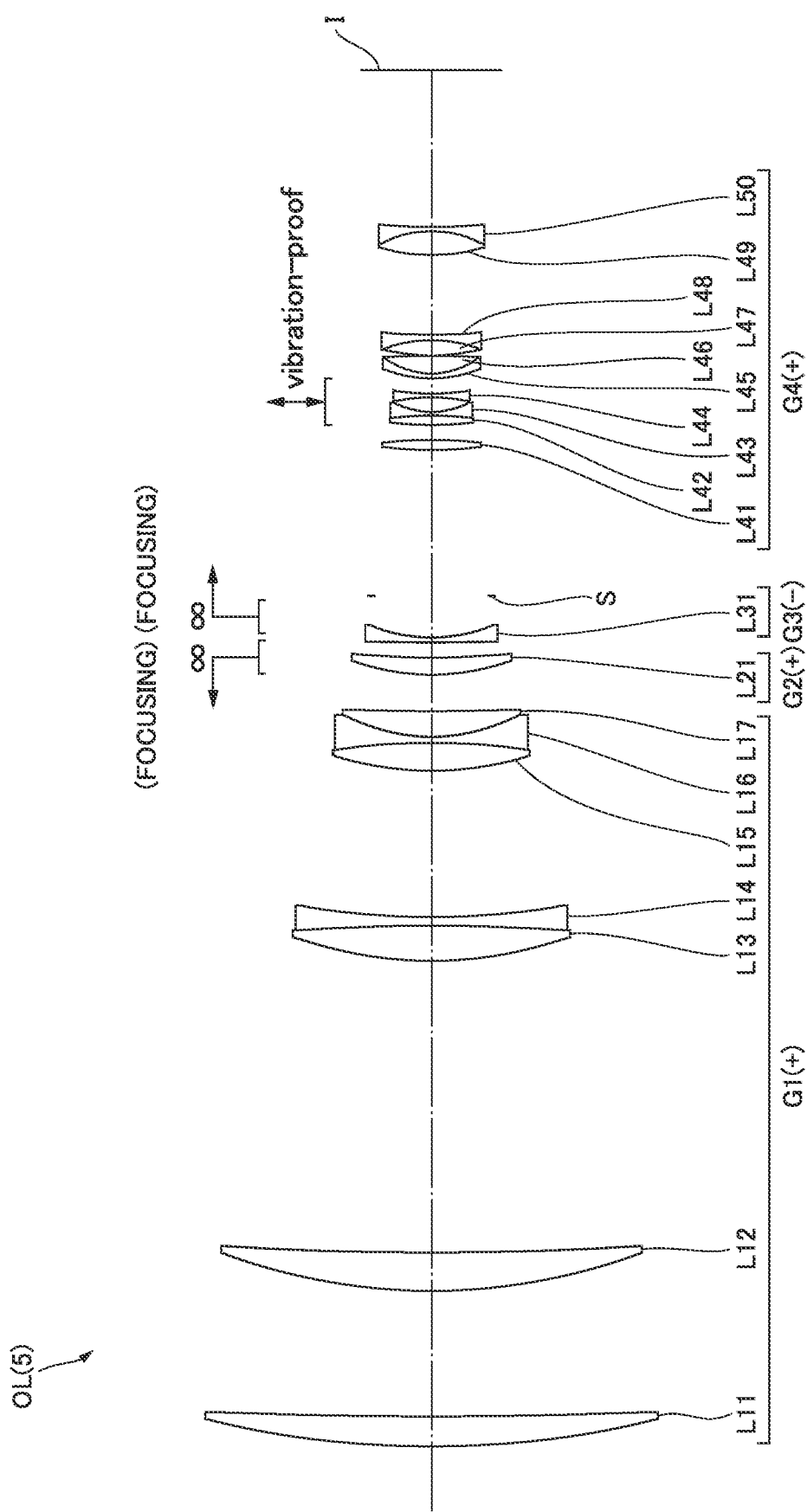
FIG. 9 shows a lens configuration of an optical system according to Fifth Example.

Fifth Example is described with reference to FIG. 9 and FIGS. 10A, and 10B and Table 5. FIG. 9 shows a lens configuration of an optical system upon focusing on infinity according to Fifth Example. The optical system OL(5) according to Fifth Example comprises, in order from the object on the optical axis: a first lens group G1 having a positive refractive power; a second lens group G2 having a positive refractive power; a third lens group G3 having a negative refractive power; and a fourth lens group G4 having a positive refractive power. Upon focusing from the infinity object to the short distance object, the second lens group G2 moves toward the object along the optical axis, the third lens group G3 moves toward the image along the optical axis, and the distance between the neighboring lens groups changes. Note that upon focusing, the first lens group G1 and the fourth lens group G4 are fixed with respect to the image surface I. The aperture stop S is disposed between the third lens group G3 and the fourth lens group G4.

The first lens group G1 comprises, in order from the object on the optical axis: a positive meniscus lens L11 having a convex surface facing the object; a positive meniscus lens L12 having a convex surface facing the object; a biconvex positive lens L13; a biconcave negative lens L14; a biconvex positive lens L15; and a cemented lens including a biconcave negative lens L16 and a positive meniscus lens L17 having a convex surface facing the object.

The second lens group G2 consists of a positive meniscus lens L21 having a convex surface facing the object. The third lens group G3 consists of a negative meniscus lens L31 having a convex surface facing the object. That is, the second lens group G2 and the third lens group G3 collectively consists of two lenses.

The fourth lens group G4 comprises, in order from the object on the optical axis: a biconvex positive lens L41; a cemented lens including a biconvex positive lens L42 and a biconcave negative lens L43; a biconcave negative lens L44; a cemented lens including a negative meniscus lens L45 having a convex surface facing the object, and a biconvex positive lens L46; a cemented lens including a biconvex positive lens L47 and a biconcave negative lens L48; and a cemented lens including a biconvex positive lens L49 and a biconcave negative lens L50. An image surface I is disposed on the image side of the fourth lens group G4.

In this Example, the positive lens L42, the negative lens L43 and the negative lens L44 of the fourth lens group G4 constitute a vibration-proof group that is movable in a direction perpendicular to the optical axis, and correct the displacement (an image blur on the image surface I) of the imaging position due to camera shakes and the like. The positive lens L15 of the first lens group G1 corresponds to a positive lens that satisfies the aforementioned conditional expressions (11) to (13). The positive meniscus lens L12, the positive lens L13 and the positive meniscus lens L17 of the first lens group G1, the positive meniscus lens L21 of the second lens group G2, and the negative lens L43 of the fourth lens group G4 correspond to lenses (specified lenses) that satisfy the conditional expression (14) described above.

The following Table 5 lists values of data on the optical system according to Fifth Example.

TABLE 5

[General Data]

| f = 587.99791 | fVR = −34.34884 |
|---|---|
| FNO = 4.10847 | Δx2 = −6.1704 |
| 2ω = 4.19942 | Δx3 = 6.3894 |
| Y = 21.63 | β2 = 0.67768 |
| TL = 438.8073 | β3 = 3.63831 |
| Bf = 49.6725 | |

[Lens Data]

| Surface Number | R | D | nd | vd | θgF |
|---|---|---|---|---|---|
| 1 | 320.9434 | 9.6000 | 1.518600 | 69.89 | 0.532 |
| 2 | 1936.3786 | 40.0000 | | | |
| 3 | 197.3125 | 12.4000 | 1.433837 | 95.16 | 0.539 |
| 4 | 1249.9826 | 92.9991 | | | |
| 5 | 139.4073 | 11.2000 | 1.433837 | 95.16 | 0.539 |
| 6 | −595.5149 | 0.1000 | | | |
| 7 | −679.6046 | 2.7000 | 1.770470 | 29.74 | 0.595 |
| 8 | 257.1482 | 46.6155 | | | |
| 9 | 111.7807 | 8.9000 | 1.663820 | 27.35 | 0.632 |
| 10 | −211.8183 | 0.1000 | | | |
| 11 | −214.3458 | 1.8000 | 1.720467 | 34.71 | 0.583 |

TABLE 5-continued

| 12 | 63.9295 | 8.0000 | 1.437001 | 95.10 | 0.534 |
|---|---|---|---|---|---|
| 13 | 643.8176 | (D13) | | | |
| 14 | 78.4833 | 5.5000 | 1.497820 | 82.57 | 0.539 |
| 15 | 379.7982 | (D15) | | | |
| 16 | 1600.8170 | 1.5000 | 1.772500 | 49.62 | 0.552 |
| 17 | 54.9089 | (D17) | | | |
| 18 | ∞ | 46.4752 | | (Aperture Stop S) | |
| 19 | 149.0722 | 3.5000 | 1.552981 | 55.07 | 0.545 |
| 20 | −96.2480 | 4.5000 | | | |
| 21 | 114.2466 | 3.0000 | 1.922859 | 20.88 | 0.628 |
| 22 | −195.3936 | 1.2000 | 1.497820 | 82.57 | 0.539 |
| 23 | 27.7113 | 4.6409 | | | |
| 24 | −60.3668 | 1.2000 | 1.729160 | 54.61 | 0.544 |
| 25 | 78.7651 | 4.9250 | | | |
| 26 | 43.5209 | 1.5000 | 1.696800 | 55.52 | 0.543 |
| 27 | 26.5639 | 5.7000 | 1.654115 | 39.68 | 0.574 |
| 28 | −233.7026 | 0.1000 | | | |
| 29 | 71.9613 | 5.0000 | 1.654115 | 39.68 | 0.574 |
| 30 | −41.4429 | 1.5000 | 1.808090 | 22.74 | 0.629 |
| 31 | 171.1519 | 25.5905 | | | |
| 32 | 63.7147 | 7.5000 | 1.603420 | 38.03 | 0.583 |
| 33 | −38.1075 | 1.5000 | 1.910822 | 35.25 | 0.582 |
| 34 | 300.4346 | Bf | | | |

[Variable Distance Data]

| | Upon focusing on infinity f = 587.99791 | Upon focusing on an intermediate distance object β = −0.0333 | Upon focusing on a very short distance object β = −0.1485 |
|---|---|---|---|
| D13 | 11.7675 | 10.1988 | 5.5971 |
| D15 | 4.7905 | 7.6839 | 17.3503 |
| D17 | 13.3307 | 12.0060 | 6.9412 |

[Lens Group Data]

| Group | First surface | Focal length |
|---|---|---|
| G1 | 1 | 282.59807 |
| G2 | 14 | 197.51986 |
| G3 | 16 | −73.63528 |
| G4 | 19 | 2049.50489 |

Figure 10A:
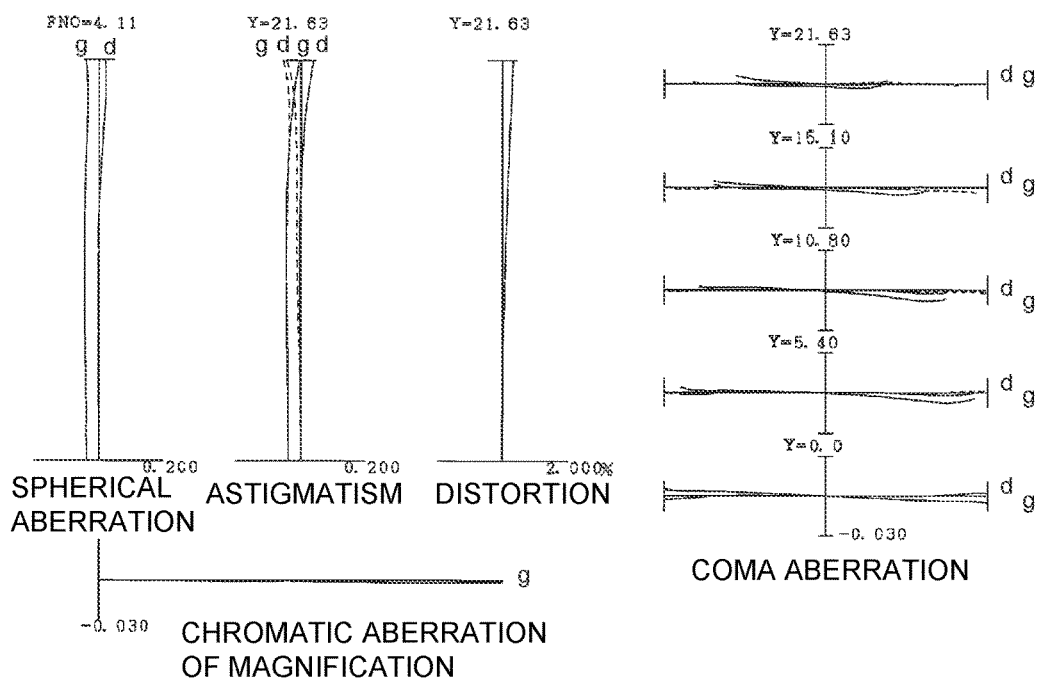
FIGS. 10A and 10B are various aberration graphs of the optical system according to Fifth Example upon focusing on infinity and upon focusing on a short distance object.
Figure 10B:
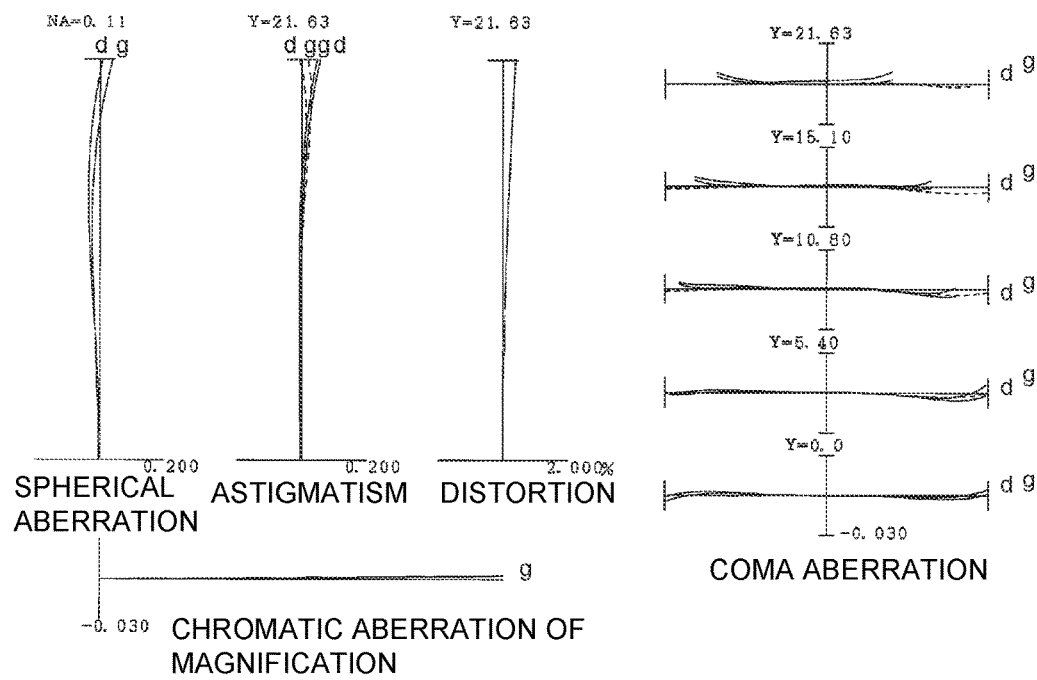

FIG. 10A, shows graphs of various aberrations of an optical system upon focusing on infinity according to Fifth Example. FIG. 10B shows graphs of various aberrations of the optical system upon focusing on the short distance object according to Fifth Example. The various aberration graphs show that in the optical system according to Fifth Example, over the entire range from focusing on infinity to focusing on the short distance object, the various aberrations are favorably corrected, and an excellent imaging performance is achieved.

Next, the table of [Conditional Expression Corresponding Value] is shown below. This table collectively indicates values corresponding to the conditional expressions (1) to (15) with respect to all the examples (First to Fifth Examples).

$0.010 < (\Delta x2A + \Delta x3A)/D1 < 0.200$     Conditional Expression (1)

$-0.20 < \Delta x2/f2 < 0.00$     Conditional Expression (2)

$-0.20 < \Delta x3/f3 < 0.00$     Conditional Expression (3)

$1.00 < f2/(-f3) < 4.00$     Conditional Expression (4)

$-3.00 < \Delta x2/\Delta x3 < -0.20$     Conditional Expression (5)

$-8.50 < f1/fVR < -3.00$     Conditional Expression (6)

$0.45 < \beta2 < 0.80$     Conditional Expression (7)

$0.20 < 1/\beta3 < 0.50$     Conditional Expression (8)

$\{\beta2+(1/\beta2)\}^{-2} < 0.25$     Conditional Expression (9)

$\{\beta3+(1/\beta3)\}^{-2} < 0.18$     Conditional Expression (10)

$ndL1+(0.01425 \times vdL1) < 2.12$     Conditional Expression (11)

$vdL1 < 35.00$     Conditional Expression (12)

$0.702 < \theta gFL1+(0.00316 \times vdL1)$     Conditional Expression (13)

$80.00 < vdL2$     Conditional Expression (14)

$3.50° < 2\omega < 8.50°$     Conditional Expression (15)

[Conditional Expression Corresponding Value] (First~Third Example)

| Conditional Expression | First example | Second example | Third example |
|---|---|---|---|
| (1) | 0.094 | 0.089 | 0.082 |
| (2) | −0.07 | −0.04 | −0.04 |
| (3) | −0.09 | −0.13 | −0.14 |
| (4) | 1.95 | 1.40 | 1.85 |
| (5) | −0.66 | −2.36 | −2.06 |
| (6) | −4.30 | −5.37 | −7.19 |
| (7) | 0.63 | 0.50 | 0.55 |
| (8) | 0.40 | 0.42 | 0.30 |
| (9) | 0.20 | 0.16 | 0.18 |
| (10) | 0.12 | 0.13 | 0.07 |
| (11) | 2.054 | 2.054 | 2.054 |
| (12) | 27.35 | 27.35 | 27.35 |
| (13) | 0.718 | 0.718 | 0.718 |
| (14) | 95.25 | 95.16 | 95.16 |
|  | 82.57 | — | — |
| (15) | 6.296 | 6.312 | 6.312 |

[Conditional Expression Corresponding Value] (Fourth-~Fifth Example)

| Conditional Expression | Fourth example | Fifth example |
|---|---|---|
| (1) | 0.044 | 0.054 |
| (2) | −0.07 | −0.03 |
| (3) | −0.02 | −0.09 |
| (4) | 1.69 | 2.68 |
| (5) | −0.22 | −1.04 |
| (6) | −5.70 | −8.23 |
| (7) | 0.54 | 0.68 |
| (8) | 0.33 | 0.27 |
| (9) | 0.17 | 0.22 |
| (10) | 0.09 | 0.07 |
| (11) | 2.054 | 2.054 |
| (12) | 27.35 | 27.35 |
| (13) | 0.718 | 0.718 |
| (14) | 95.16 | 95.16 |
|  | 82.57 | 82.57 |
| (15) | 4.153 | 4.199 |

According to each of Examples described above, the fast optical system that has a long focal length and has an excellent optical performance from focusing on infinity to focusing on the short distance object, can be achieved.

Each of the aforementioned Examples describes a specific example of the invention of the present application. The invention of the present application is not limited to these examples.

The following content can be adopted in a range without impairing the optical performance of the optical system according to this embodiment.

The four-group configurations are described as Examples of the optical systems according to this embodiment. However, the present application is not limited to these configurations. An optical system having another group configuration (e.g., a five-group one etc.) may be configured. Specifically, a configuration where a lens or a lens group is added to a position of the optical system of this embodiment closest to the object or a position closest to the image surface, and a configuration where a lens or a lens group is added between the second lens group (first focusing lens group) and the third lens group (second focusing lens group), may be adopted. Note that the lens group indicates a portion that includes at least one lens separated by air distances that change during focusing.

What has the configuration with the vibration-proof function is described as Example of the optical system according to this embodiment. However, the present application is not limited to this configuration. A configuration that has no vibration-proof function may be adopted.

The lens surface may be made of a spherical surface or a planar surface, or an aspherical surface. A case where the lens surface is a spherical surface or a planar surface is preferable, because lens processing, and assembling and adjustment are facilitated, and the optical performance degradation due to errors caused by processing and assembling and adjustment can be prevented. It is also preferable because the degradation in representation performance is small even with a possible misaligned image surface.

In the cases where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

Preferably, the aperture stop is disposed between the third lens group and the fourth lens group, or in the fourth lens group. Alternatively, a member as an aperture stop is not necessarily provided, and a lens frame may serve as what has the function instead.

An antireflection film having a high transmissivity in a wide wavelength region may be applied onto each lens surface in order to reduce flares and ghosts and achieve optical performances having a high contrast.

EXPLANATION OF NUMERALS AND CHARACTERS

| | |
|---|---|
| G1 First lens group | G2 Second lens group |
| G3 Third lens group | G4 Fourth lens group |
| I Image surface | S Aperture stop |

The invention claimed is:

1. An optical system, comprising, in order from an object on an optical axis: a first lens group having a positive refractive power; a second lens group; a third lens group; and a fourth lens group, wherein upon focusing from an infinity object to a short distance object, the second lens group and the third lens group move along the optical axis respectively on trajectories different from each other, and the second lens group and the third lens group collectively include three lenses or less, wherein the fourth lens group comprises a vibration-proof group that has a negative refractive power and is movable so as to have a displacement component in a direction perpendicular to the optical axis to correct an image blur, and the following conditional expression is satisfied, $$-8.50 < f1/fVR < -3.00$$

where f1: a focal length of the first lens group, and
fVR: a focal length of the vibration-proof group.

2. The optical system according to claim 1,
wherein the following conditional expression is satisfied, $$-0.20 < \Delta x2/f2 < 0.00$$

where $\Delta x2$: an amount of movement of the second lens group (a sign of an amount of movement toward an image surface is + and a sign of the amount of movement toward the object is −) upon focusing from the infinity object to the short distance object, and
f2: a focal length of the second lens group.

3. The optical system according to claim 1,
wherein the following conditional expression is satisfied, $$-0.20 < \Delta x3/f3 < 0.00$$

where $\Delta x3$: an amount of movement of the third lens group (a sign of an amount of movement toward an image surface is + and a sign of the amount of movement toward the object is −) upon focusing from the infinity object to the short distance object, and
f3: a focal length of the third lens group.

4. The optical system according to claim 1,
wherein the following conditional expression is satisfied, $$1.00 < f2/(-f3) < 4.00$$

where f2: a focal length of the second lens group, and
f3: a focal length of the third lens group.

5. The optical system according to claim 1,
wherein the following conditional expression is satisfied, $$-3.00 < \Delta x2/\Delta x3 < -0.20$$

where $\Delta x2$: an amount of movement of the second lens group (a sign of an amount of movement toward an image surface is + and a sign of the amount of movement toward the object is −) upon focusing from the infinity object to the short distance object, and
$\Delta x3$: an amount of movement of the third lens group (a sign of the amount of movement toward the image surface is + and a sign of the amount of movement toward the object is −) upon focusing from the infinity object to the short distance object.

6. The optical system according to claim 1, wherein the vibration-proof group comprises two or more lenses.

7. The optical system according to claim 1,
wherein the following conditional expression is satisfied, $$0.45 < \beta2 < 0.80$$

where $\beta2$: a magnification of the second lens group upon focusing on the infinity object.

8. The optical system according to claim 1,
wherein the following conditional expression is satisfied, $$0.20 < 1/\beta3 < 0.50$$

where $\beta3$: a magnification of the third lens group upon focusing on the infinity object.

9. The optical system according to claim 1,
wherein the following conditional expression is satisfied, $$\{\beta2+(1/\beta2)\}^{-2} < 0.25$$

where $\beta2$: a magnification of the second lens group upon focusing on the infinity object.

10. The optical system according to claim 1,
wherein the following conditional expression is satisfied, $$\{\beta3+(1/\beta3)\}^{-2} < 0.18$$

where $\beta3$: a magnification of the third lens group upon focusing on the infinity object.

11. The optical system according to claim 1,
wherein the first lens group comprises a positive lens which satisfies the following conditional expressions, $$ndL1+(0.01425 \times vdL1) < 2.12,$$

$$vdL1 < 35.00, \text{ and}$$

$$0.702 < \theta gFL1+(0.00316 \times vdL1)$$

where ndL1: a refractive index of the positive lens for d-line,
vdL1: an Abbe number of the positive lens with reference to d-line, and
$\theta gFL1$: a partial dispersion ratio of the positive lens, the partial dispersion ratio being defined by the following expression, assuming that a refractive index of the positive lens for g-line is ngL1, a refractive index of the positive lens for F-line is nFL1, and a refractive index of the positive lens for C-line is nCL1, $$\theta gFL1=(ngL1-nFL1)/(nFL1-nCL1).$$

12. The optical system according to claim 1, further comprising a lens that satisfies the following conditional expression, $$80.00 < vdL2$$

where vdL2: an Abbe number of the lens with reference to d-line.

13. The optical system according to claim 1,
wherein the following conditional expression is satisfied, $$3.50° < 2\omega < 8.50°$$

where $2\omega$: a full angle of view of the optical system.

14. The optical system according to claim 1, wherein upon focusing from the infinity object to the short distance object, the second lens group moves along the optical axis toward the object, and the third lens group moves along the optical axis toward the image surface.

15. The optical system according to claim 1, wherein the second lens group consists of one lens.

16. The optical system according to claim 1, wherein the third lens group consists of one lens component.

17. The optical system according to claim 1, further comprising an aperture stop disposed closer to the image surface than the second lens group.

18. The optical system according to claim 17, wherein the aperture stop is disposed closer to the image surface than the third lens group.

19. An optical apparatus comprising the optical system according to claim 1.

20. An optical system, comprising, in order from an object on an optical axis: a first lens group having a positive refractive power; a second lens group; a third lens group; and a fourth lens group, wherein upon focusing from an infinity object to a short distance object, the second lens group and the third lens group move along the optical axis respectively on trajectories different from each other, wherein the fourth lens group comprises a vibration-proof group that has a negative refractive power and is movable so as to have a displacement component in a direction perpendicular to the optical axis to correct an image blur, and the following conditional expressions are satisfied, $$0.010 < (\Delta x2A + \Delta x3A)/D1 < 0.200$$

$$-8.50 < f1/fVR < -3.00$$

where $\Delta x2A$: an absolute value of an amount of movement of the second lens group upon focusing from an infinity object to a short distance object, $\Delta x3A$: an absolute value of an amount of movement of the third lens group upon focusing from the infinity object to the short distance object, D1: a length of the first lens group on the optical axis, f1: a focal length of the first lens group, and fVR: a focal length of the vibration-proof group.

21. A method for manufacturing an optical system comprising, in order from an object on an optical axis: a first lens group having a positive refractive power; a second lens group; a third lens group; and a fourth lens group, the method comprises a step of disposing the first to the fourth lens groups in a lens barrel so that:

upon focusing from an infinity object to a short distance object, the second lens group and the third lens group move along the optical axis respectively on trajectories different from each other, and the second lens group and the third lens group collectively include three lenses or less, wherein the fourth lens group comprises a vibration-proof group that has a negative refractive power and is movable so as to have a displacement component in a direction perpendicular to the optical axis to correct an image blur, and the following conditional expression is satisfied, $$-8.50 < f1/fVR < -3.00$$

where f1: a focal length of the first lens group, and fVR: a focal length of the vibration-proof group.

* * * * *